(12) United States Patent
Quanci et al.

(10) Patent No.: US 11,486,572 B2
(45) Date of Patent: Nov. 1, 2022

(54) SYSTEMS AND METHODS FOR UTILIZING FLUE GAS

(71) Applicant: SUNCOKE TECHNOLOGY AND DEVELOPMENT LLC, Lisle, IL (US)

(72) Inventors: John Francis Quanci, Haddonfield, NJ (US); Anthony Hanlin, Lisle, IL (US); Jennifer McLaren, Lisle, IL (US)

(73) Assignee: SUNCOKE TECHNOLOGY AND DEVELOPMENT LLC, Lisle, IL (US)

(*) Notice: Subject to any disclaimer, the term of this patent is extended or adjusted under 35 U.S.C. 154(b) by 322 days.

(21) Appl. No.: 16/729,068

(22) Filed: Dec. 27, 2019

(65) Prior Publication Data
US 2020/0208833 A1 Jul. 2, 2020

Related U.S. Application Data

(60) Provisional application No. 62/787,116, filed on Dec. 31, 2018.

(51) Int. Cl.
| | |
|---|---|
| *F22B 1/18* | (2006.01) |
| *F01K 23/10* | (2006.01) |
| *E04F 13/14* | (2006.01) |
| *F27D 17/00* | (2006.01) |

(52) U.S. Cl.
CPC .......... *F22B 1/1876* (2013.01); *E04F 13/142* (2013.01); *F01K 23/10* (2013.01); *F27D 17/002* (2013.01); *F27D 17/004* (2013.01)

(58) Field of Classification Search
CPC .................................................. F22B 1/1876
See application file for complete search history.

(56) References Cited

U.S. PATENT DOCUMENTS

| | | |
|---|---|---|
| 425,797 A | 4/1890 | Hunt |
| 469,868 A | 3/1892 | Osbourn |
| 760,372 A | 5/1904 | Beam |

(Continued)

FOREIGN PATENT DOCUMENTS

| | | |
|---|---|---|
| CA | 1172895 | 8/1984 |
| CA | 2775992 | 5/2011 |

(Continued)

OTHER PUBLICATIONS

U.S. Appl. No. 07/587,742, filed Sep. 25, 1990, now U.S. Pat. No. 5,114,542, titled Nonrecovery Coke Oven Battery and Method of Operation.

(Continued)

*Primary Examiner* — Nathaniel Herzfeld
(74) *Attorney, Agent, or Firm* — Perkins Coie LLP

(57) ABSTRACT

Systems and apparatuses for cooling flue gases emitted from an industrial facility, such as a coke oven in a coke manufacturing plant. A representative system includes a heat recovery steam generator (HRSG) having a steam generation system that converts liquid feedwater into steam by absorbing heat from the flue gases. The steam generation system includes a plurality of tubes that carry the liquid water feedwater and the steam. Some or all of the tubes include steel and a non-corrosive material cladded to the steel that helps to reduce corrosion caused by the high temperature flue gases and extremely corrosive contaminants within the flue gas that can corrode steel.

21 Claims, 18 Drawing Sheets

(56) References Cited

U.S. PATENT DOCUMENTS

| | | |
|---|---|---|
| 845,719 A | 2/1907 | Schniewind |
| 875,989 A | 1/1908 | Garner |
| 976,580 A | 7/1909 | Krause |
| 1,140,798 A | 5/1915 | Carpenter |
| 1,378,782 A | 5/1921 | Floyd |
| 1,424,777 A | 8/1922 | Schondeling |
| 1,430,027 A | 9/1922 | Plantinga |
| 1,486,401 A | 3/1924 | Van Ackeren |
| 1,530,995 A | 3/1925 | Geiger |
| 1,572,391 A | 2/1926 | Klaiber |
| 1,677,973 A | 7/1928 | Marquard |
| 1,705,039 A | 3/1929 | Thornhill |
| 1,721,813 A | 7/1929 | Geipert |
| 1,757,682 A | 5/1930 | Palm |
| 1,818,370 A | 8/1931 | Wine |
| 1,818,994 A | 8/1931 | Kreisinger |
| 1,830,951 A | 11/1931 | Lovett |
| 1,848,818 A | 3/1932 | Becker |
| 1,895,202 A | 1/1933 | Montgomery |
| 1,947,499 A | 2/1934 | Schrader et al. |
| 1,955,962 A | 4/1934 | Jones |
| 1,979,507 A | 11/1934 | Underwood |
| 2,075,337 A | 3/1937 | Burnaugh |
| 2,141,035 A | 12/1938 | Daniels |
| 2,195,466 A | 4/1940 | Otto |
| 2,235,970 A | 3/1941 | Wilputte |
| 2,340,283 A | 1/1944 | Vladu |
| 2,340,981 A | 2/1944 | Otto |
| 2,394,173 A | 2/1946 | Harris et al. |
| 2,424,012 A | 7/1947 | Bangham et al. |
| 2,486,199 A | 10/1949 | Nier |
| 2,609,948 A | 9/1952 | Laveley |
| 2,641,575 A | 6/1953 | Otto |
| 2,649,978 A | 8/1953 | Such |
| 2,667,185 A | 1/1954 | Beavers |
| 2,723,725 A | 11/1955 | Keiffer |
| 2,756,842 A | 7/1956 | Chamberlin et al. |
| 2,813,708 A | 11/1957 | Frey |
| 2,827,424 A | 3/1958 | Homan |
| 2,873,816 A | 2/1959 | Emil et al. |
| 2,902,991 A | 9/1959 | Whitman |
| 2,907,698 A | 10/1959 | Schulz |
| 2,968,083 A | 1/1961 | Lentz et al. |
| 3,015,893 A | 1/1962 | McCreary |
| 3,026,715 A | 3/1962 | Briggs |
| 3,033,764 A | 5/1962 | Hannes |
| 3,175,961 A | 3/1965 | Samson |
| 3,199,135 A | 8/1965 | Trucker |
| 3,224,805 A | 12/1965 | Clyatt |
| 3,259,551 A | 7/1966 | Thompson, Jr. |
| 3,265,044 A * | 8/1966 | Juchtern ............... F22B 37/203 122/510 |
| 3,267,913 A * | 8/1966 | Bruhl .................. F22B 37/203 122/510 |
| 3,327,521 A | 6/1967 | Briggs |
| 3,342,990 A | 9/1967 | Barrington et al. |
| 3,444,046 A | 5/1969 | Harlow |
| 3,444,047 A | 5/1969 | Wilde |
| 3,448,012 A | 6/1969 | Allred |
| 3,462,345 A | 8/1969 | Kernan |
| 3,511,030 A | 5/1970 | Brown et al. |
| 3,542,650 A | 11/1970 | Kulakov |
| 3,545,470 A | 12/1970 | Paton |
| 3,587,198 A | 6/1971 | Hensel |
| 3,591,827 A | 7/1971 | Hall |
| 3,592,742 A | 7/1971 | Thompson |
| 3,616,408 A | 10/1971 | Hickam |
| 3,623,511 A | 11/1971 | Levin |
| 3,630,852 A | 12/1971 | Nashan et al. |
| 3,652,403 A | 3/1972 | Knappstein et al. |
| 3,676,305 A | 7/1972 | Cremer |
| 3,709,794 A | 1/1973 | Kinzler et al. |
| 3,710,551 A | 1/1973 | Sved |
| 3,746,626 A | 7/1973 | Morrison, Jr. |
| 3,748,235 A | 7/1973 | Pries |
| 3,784,034 A | 1/1974 | Thompson |
| 3,806,032 A | 4/1974 | Pries |
| 3,811,572 A | 5/1974 | Tatterson |
| 3,836,161 A | 10/1974 | Pries |
| 3,839,156 A | 10/1974 | Jakobie et al. |
| 3,844,900 A | 10/1974 | Schulte |
| 3,857,758 A | 12/1974 | Mole |
| 3,875,016 A | 4/1975 | Schmidt-Balve |
| 3,876,143 A | 4/1975 | Rossow et al. |
| 3,876,506 A | 4/1975 | Dix et al. |
| 3,878,053 A | 4/1975 | Hyde |
| 3,894,302 A | 7/1975 | Lasater |
| 3,897,312 A | 7/1975 | Armour et al. |
| 3,906,992 A | 9/1975 | Leach |
| 3,912,091 A | 10/1975 | Thompson |
| 3,912,597 A | 10/1975 | MacDonald |
| 3,917,458 A | 11/1975 | Polak |
| 3,928,144 A | 12/1975 | Jakimowicz |
| 3,930,961 A | 1/1976 | Sustarsic et al. |
| 3,933,443 A | 1/1976 | Lohrmann |
| 3,957,591 A | 5/1976 | Riecker |
| 3,959,084 A | 5/1976 | Price |
| 3,963,582 A | 6/1976 | Helm et al. |
| 3,969,191 A | 7/1976 | Bollenbach |
| 3,975,148 A | 8/1976 | Fukuda et al. |
| 3,979,870 A | 9/1976 | Moore |
| 3,984,289 A | 10/1976 | Sustarsic et al. |
| 3,990,948 A | 11/1976 | Lindgren |
| 4,004,702 A | 1/1977 | Szendroi |
| 4,004,983 A | 1/1977 | Pries |
| 4,025,395 A | 5/1977 | Ekholm et al. |
| 4,040,910 A | 8/1977 | Knappstein et al. |
| 4,045,056 A | 8/1977 | Kandakov et al. |
| 4,045,299 A | 8/1977 | McDonald |
| 4,059,885 A | 11/1977 | Oldengott |
| 4,065,059 A | 12/1977 | Jablin |
| 4,067,462 A | 1/1978 | Thompson |
| 4,077,848 A | 3/1978 | Grainer et al. |
| 4,083,753 A | 4/1978 | Rogers et al. |
| 4,086,231 A | 4/1978 | Ikio |
| 4,093,245 A | 6/1978 | Connor |
| 4,100,033 A | 7/1978 | Holter |
| 4,100,491 A | 7/1978 | Newman, Jr. et al. |
| 4,100,889 A * | 7/1978 | Chayes ................ F22B 37/202 165/162 |
| 4,111,757 A | 9/1978 | Carimboli |
| 4,124,450 A | 11/1978 | MacDonald |
| 4,133,720 A | 1/1979 | Franzer et al. |
| 4,135,948 A | 1/1979 | Mertens et al. |
| 4,141,796 A | 2/1979 | Clark et al. |
| 4,143,104 A | 3/1979 | van Konijnenburg et al. |
| 4,145,195 A | 3/1979 | Knappstein et al. |
| 4,147,230 A | 4/1979 | Ormond et al. |
| 4,162,546 A | 7/1979 | Shortell et al. |
| 4,181,459 A | 1/1980 | Price |
| 4,189,272 A | 2/1980 | Gregor et al. |
| 4,194,951 A | 3/1980 | Pries |
| 4,196,053 A | 4/1980 | Grohmann |
| 4,211,608 A | 7/1980 | Kwasnoski et al. |
| 4,211,611 A | 7/1980 | Bocsanczy |
| 4,213,489 A | 7/1980 | Cain |
| 4,213,828 A | 7/1980 | Calderon |
| 4,222,748 A | 9/1980 | Argo et al. |
| 4,222,824 A | 9/1980 | Flockenhaus et al. |
| 4,224,109 A | 9/1980 | Flockenhaus et al. |
| 4,225,393 A | 9/1980 | Gregor et al. |
| 4,226,113 A | 10/1980 | Pelletier et al. |
| 4,230,498 A | 10/1980 | Ruecki |
| 4,235,830 A | 11/1980 | Bennett et al. |
| 4,239,602 A | 12/1980 | La Bate |
| 4,248,671 A | 2/1981 | Belding |
| 4,249,997 A | 2/1981 | Schmitz |
| 4,263,099 A | 4/1981 | Porter |
| 4,268,360 A | 5/1981 | Tsuzuki et al. |
| 4,271,814 A | 6/1981 | Lister |
| 4,284,478 A | 8/1981 | Brommel |
| 4,285,772 A | 8/1981 | Kress |
| 4,287,024 A | 9/1981 | Thompson |
| 4,289,479 A | 9/1981 | Johnson |

(56) References Cited

U.S. PATENT DOCUMENTS

| | | |
|---|---|---|
| 4,289,584 A | 9/1981 | Chuss et al. |
| 4,289,585 A | 9/1981 | Wagener et al. |
| 4,296,938 A | 10/1981 | Offermann et al. |
| 4,299,666 A | 11/1981 | Ostmann |
| 4,302,935 A | 12/1981 | Cousimano |
| 4,303,615 A | 12/1981 | Jarmell et al. |
| 4,307,673 A | 12/1981 | Caughey |
| 4,314,787 A | 2/1982 | Kwasnik et al. |
| 4,316,435 A * | 2/1982 | Nagamatsu .......... F22B 1/1815 122/7 D |
| 4,324,568 A | 4/1982 | Wilcox et al. |
| 4,330,372 A | 5/1982 | Cairns et al. |
| 4,334,963 A | 6/1982 | Stog |
| 4,336,107 A | 6/1982 | Irwin |
| 4,336,843 A | 6/1982 | Petty |
| 4,340,445 A | 7/1982 | Kucher et al. |
| 4,342,195 A | 8/1982 | Lo |
| 4,344,820 A | 8/1982 | Thompson |
| 4,344,822 A | 8/1982 | Schwartz et al. |
| 4,353,189 A | 10/1982 | Thiersch et al. |
| 4,366,029 A | 12/1982 | Bixby et al. |
| 4,373,244 A | 2/1983 | Mertens et al. |
| 4,375,388 A | 3/1983 | Hara et al. |
| 4,385,962 A | 5/1983 | Stewen et al. |
| 4,391,674 A | 7/1983 | Velmin et al. |
| 4,392,824 A | 7/1983 | Struck et al. |
| 4,394,217 A | 7/1983 | Holz et al. |
| 4,395,269 A | 7/1983 | Schuler |
| 4,396,394 A | 8/1983 | Li et al. |
| 4,396,461 A | 8/1983 | Neubaum et al. |
| 4,407,237 A | 10/1983 | Merritt |
| 4,421,070 A | 12/1983 | Sullivan |
| 4,431,484 A | 2/1984 | Weber et al. |
| 4,439,277 A | 3/1984 | Dix |
| 4,440,098 A | 4/1984 | Adams |
| 4,445,977 A | 5/1984 | Husher |
| 4,446,018 A | 5/1984 | Cerwick |
| 4,448,541 A | 5/1984 | Lucas |
| 4,452,749 A | 6/1984 | Kolvek et al. |
| 4,459,103 A | 7/1984 | Gieskieng |
| 4,469,446 A | 9/1984 | Goodboy |
| 4,474,344 A | 10/1984 | Bennett |
| 4,487,137 A | 12/1984 | Horvat et al. |
| 4,498,786 A | 2/1985 | Ruscheweyh |
| 4,506,025 A | 3/1985 | Kleeb et al. |
| 4,508,539 A | 4/1985 | Nakai |
| 4,518,461 A | 5/1985 | Gelfand |
| 4,527,488 A | 7/1985 | Lindgren |
| 4,564,420 A | 1/1986 | Spindeler et al. |
| 4,568,426 A | 2/1986 | Orlando |
| 4,570,670 A | 2/1986 | Johnson |
| 4,614,567 A | 9/1986 | Stahlherm et al. |
| 4,643,327 A | 2/1987 | Campbell |
| 4,645,513 A | 2/1987 | Kubota et al. |
| 4,655,193 A | 4/1987 | Blacket |
| 4,655,804 A | 4/1987 | Kercheval et al. |
| 4,666,675 A | 5/1987 | Parker et al. |
| 4,680,167 A | 7/1987 | Orlando |
| 4,690,689 A | 9/1987 | Malcosky et al. |
| 4,704,195 A | 11/1987 | Janicka et al. |
| 4,720,262 A | 1/1988 | Durr et al. |
| 4,724,976 A | 2/1988 | Lee |
| 4,726,465 A | 2/1988 | Kwasnik et al. |
| 4,732,652 A | 3/1988 | Durselen et al. |
| 4,749,446 A | 6/1988 | van Laar et al. |
| 4,793,981 A | 12/1988 | Doyle et al. |
| 4,821,473 A | 4/1989 | Cowell |
| 4,824,614 A | 4/1989 | Jones et al. |
| 4,889,698 A | 12/1989 | Moller et al. |
| 4,898,021 A | 2/1990 | Weaver et al. |
| 4,918,975 A | 4/1990 | Voss |
| 4,919,170 A | 4/1990 | Kallinich et al. |
| 4,929,179 A | 5/1990 | Breidenbach et al. |
| 4,941,824 A | 7/1990 | Holter et al. |
| 5,052,922 A | 10/1991 | Stokman et al. |
| 5,062,925 A | 11/1991 | Durselen et al. |
| 5,078,822 A | 1/1992 | Hodges et al. |
| 5,087,328 A | 2/1992 | Wegerer et al. |
| 5,114,542 A | 5/1992 | Childress et al. |
| 5,213,138 A | 5/1993 | Presz |
| 5,227,106 A | 7/1993 | Kolvek |
| 5,228,955 A | 7/1993 | Westbrook, III |
| 5,234,601 A | 8/1993 | Janke et al. |
| 5,318,671 A | 6/1994 | Pruitt |
| 5,370,218 A | 12/1994 | Johnson et al. |
| 5,398,543 A | 3/1995 | Fukushima et al. |
| 5,423,152 A | 6/1995 | Kolvek |
| 5,447,606 A | 9/1995 | Pruitt |
| 5,480,594 A | 1/1996 | Wilkerson et al. |
| 5,542,650 A | 8/1996 | Abel et al. |
| 5,597,452 A | 1/1997 | Hippe et al. |
| 5,622,280 A | 4/1997 | Mays et al. |
| 5,659,110 A | 8/1997 | Herden et al. |
| 5,670,025 A | 9/1997 | Baird |
| 5,687,768 A | 11/1997 | Albrecht et al. |
| 5,705,037 A | 1/1998 | Reinke et al. |
| 5,715,962 A | 2/1998 | McDonnell |
| 5,720,855 A | 2/1998 | Baird |
| 5,752,548 A | 5/1998 | Matsumoto et al. |
| 5,787,821 A | 8/1998 | Bhat et al. |
| 5,810,032 A | 9/1998 | Hong et al. |
| 5,816,210 A | 10/1998 | Yamaguchi |
| 5,857,308 A | 1/1999 | Dismore et al. |
| 5,881,551 A * | 3/1999 | Dang ................... F22B 1/1861 122/7 B |
| 5,913,448 A | 6/1999 | Mann et al. |
| 5,928,476 A | 7/1999 | Daniels |
| 5,966,886 A | 10/1999 | Di Loreto |
| 5,968,320 A | 10/1999 | Sprague |
| 6,002,993 A | 12/1999 | Naito et al. |
| 6,017,214 A | 1/2000 | Sturgulewski |
| 6,059,932 A | 5/2000 | Sturgulewski |
| 6,139,692 A | 10/2000 | Tamura et al. |
| 6,152,668 A | 11/2000 | Knoch |
| 6,156,688 A | 12/2000 | Ando et al. |
| 6,173,679 B1 * | 1/2001 | Bruckner .............. F22B 1/1815 122/451 S |
| 6,187,148 B1 | 2/2001 | Sturgulewski |
| 6,189,819 B1 | 2/2001 | Racine |
| 6,290,494 B1 | 9/2001 | Barkdoll |
| 6,412,221 B1 | 7/2002 | Emsbo |
| 6,495,268 B1 * | 12/2002 | Harth, III .............. F22B 37/107 138/143 |
| 6,539,602 B1 | 4/2003 | Ozawa et al. |
| 6,596,128 B2 | 7/2003 | Westbrook |
| 6,626,984 B1 | 9/2003 | Taylor |
| 6,699,035 B2 | 3/2004 | Brooker |
| 6,712,576 B2 | 3/2004 | Skarzenski et al. |
| 6,758,875 B2 | 7/2004 | Reid et al. |
| 6,786,941 B2 | 9/2004 | Reeves et al. |
| 6,830,660 B1 | 12/2004 | Yamauchi et al. |
| 6,907,895 B2 | 6/2005 | Johnson et al. |
| 6,946,011 B2 | 9/2005 | Snyder |
| 6,964,236 B2 | 11/2005 | Schucker |
| 7,056,390 B2 | 6/2006 | Fratello |
| 7,077,892 B2 | 7/2006 | Lee |
| 7,314,060 B2 | 1/2008 | Chen et al. |
| 7,331,298 B2 | 2/2008 | Barkdoll et al. |
| 7,433,743 B2 | 10/2008 | Pistikopoulos et al. |
| 7,497,930 B2 | 3/2009 | Barkdoll et al. |
| 7,547,377 B2 | 6/2009 | Inamasu et al. |
| 7,611,609 B1 | 11/2009 | Valia et al. |
| 7,644,711 B2 | 1/2010 | Creel |
| 7,722,843 B1 | 5/2010 | Srinivasachar |
| 7,727,307 B2 | 6/2010 | Winkler |
| 7,785,447 B2 | 8/2010 | Eatough et al. |
| 7,803,627 B2 | 9/2010 | Hodges et al. |
| 7,823,401 B2 | 11/2010 | Takeuchi et al. |
| 7,827,689 B2 | 11/2010 | Crane |
| 7,998,316 B2 | 8/2011 | Barkdoll |
| 8,071,060 B2 | 12/2011 | Ukai et al. |
| 8,079,751 B2 | 12/2011 | Kapila et al. |
| 8,080,088 B1 | 12/2011 | Srinivasachar |
| 8,146,376 B1 | 4/2012 | Williams et al. |

(56) References Cited

U.S. PATENT DOCUMENTS

| | | | |
|---|---|---|---|
| 8,152,970 B2 | 4/2012 | Barkdoll et al. |
| 8,172,930 B2 | 5/2012 | Barkdoll |
| 8,236,142 B2 | 8/2012 | Westbrook |
| 8,266,853 B2 | 9/2012 | Bloom et al. |
| 8,398,935 B2 | 3/2013 | Howell et al. |
| 8,409,405 B2 | 4/2013 | Kim et al. |
| 8,500,881 B2 | 8/2013 | Orita et al. |
| 8,515,508 B2 | 8/2013 | Kawamura et al. |
| 8,568,568 B2 | 10/2013 | Schuecker et al. |
| 8,640,635 B2 | 2/2014 | Bloom et al. |
| 8,647,476 B2 | 2/2014 | Kim et al. |
| 8,800,795 B2 | 8/2014 | Hwang |
| 8,956,995 B2 | 2/2015 | Masatsugu et al. |
| 8,980,063 B2 | 3/2015 | Kim et al. |
| 9,039,869 B2 | 5/2015 | Kim et al. |
| 9,057,023 B2 | 6/2015 | Reichelt et al. |
| 9,103,234 B2 | 8/2015 | Gu et al. |
| 9,193,915 B2 | 11/2015 | West et al. |
| 9,238,778 B2 | 1/2016 | Quanci et al. |
| 9,243,186 B2 | 1/2016 | Quanci et al. |
| 9,249,357 B2 | 2/2016 | Quanci et al. |
| 9,273,249 B2 | 3/2016 | Quanci et al. |
| 9,359,554 B2 | 6/2016 | Quanci et al. |
| 9,404,043 B2 | 8/2016 | Kim |
| 9,463,980 B2 | 10/2016 | Fukada et al. |
| 9,498,786 B2 | 11/2016 | Pearson |
| 9,580,656 B2 | 2/2017 | Quanci et al. |
| 9,672,499 B2 | 6/2017 | Quanci et al. |
| 9,708,542 B2 | 7/2017 | Quanci et al. |
| 9,862,888 B2 | 1/2018 | Quanci et al. |
| 9,976,089 B2 | 5/2018 | Quanci et al. |
| 10,016,714 B2 | 7/2018 | Quanci et al. |
| 10,041,002 B2 | 8/2018 | Quanci et al. |
| 10,047,295 B2 | 8/2018 | Chun et al. |
| 10,047,296 B2 | 8/2018 | Chun et al. |
| 10,053,627 B2 | 8/2018 | Sarpen et al. |
| 10,233,392 B2 | 3/2019 | Quanci et al. |
| 10,308,876 B2 | 6/2019 | Quanci et al. |
| 10,323,192 B2 | 6/2019 | Quanci et al. |
| 10,526,541 B2 | 1/2020 | West et al. |
| 10,578,521 B1 | 3/2020 | Dinakaran et al. |
| 10,732,621 B2 | 8/2020 | Cella et al. |
| 10,877,007 B2 | 12/2020 | Steele et al. |
| 11,008,517 B2 | 5/2021 | Chun et al. |
| 2002/0170605 A1 | 11/2002 | Shiraishi et al. |
| 2003/0014954 A1 | 1/2003 | Ronning et al. |
| 2003/0015809 A1 | 1/2003 | Carson |
| 2003/0057083 A1 | 3/2003 | Eatough et al. |
| 2004/0220840 A1 | 11/2004 | Bonissone et al. |
| 2005/0087767 A1 | 4/2005 | Fitzgerald et al. |
| 2005/0096759 A1 | 5/2005 | Benjamine et al. |
| 2006/0029532 A1 | 2/2006 | Breen et al. |
| 2006/0102420 A1 | 5/2006 | Huber et al. |
| 2006/0149407 A1 | 7/2006 | Markham et al. |
| 2007/0087946 A1 | 4/2007 | Quest et al. |
| 2007/0102278 A1 | 5/2007 | Inamasu et al. |
| 2007/0116619 A1 | 5/2007 | Taylor et al. |
| 2007/0251198 A1 | 11/2007 | Witter |
| 2008/0028935 A1 | 2/2008 | Andersson |
| 2008/0179165 A1 | 7/2008 | Chen et al. |
| 2008/0250863 A1 | 10/2008 | Moore |
| 2008/0257236 A1 | 10/2008 | Green |
| 2008/0271985 A1 | 11/2008 | Yamasaki |
| 2008/0289305 A1 | 11/2008 | Girondi |
| 2009/0007785 A1 | 1/2009 | Kimura et al. |
| 2009/0032385 A1 | 2/2009 | Engle |
| 2009/0105852 A1 | 4/2009 | Wintrich et al. |
| 2009/0152092 A1 | 6/2009 | Kim et al. |
| 2009/0162269 A1 | 6/2009 | Barger et al. |
| 2009/0217576 A1 | 9/2009 | Kim et al. |
| 2009/0257932 A1 | 10/2009 | Canari et al. |
| 2009/0283395 A1 | 11/2009 | Hippe |
| 2010/0015564 A1* | 1/2010 | Chun .................. C23C 28/322 138/143 |
| 2010/0095521 A1 | 4/2010 | Kartal et al. |
| 2010/0106310 A1 | 4/2010 | Grohman |
| 2010/0113266 A1 | 5/2010 | Abe et al. |
| 2010/0115912 A1 | 5/2010 | Worley |
| 2010/0119425 A1 | 5/2010 | Palmer |
| 2010/0181297 A1 | 7/2010 | Whysail |
| 2010/0196597 A1 | 8/2010 | Di Loreto |
| 2010/0276269 A1 | 11/2010 | Schuecker et al. |
| 2010/0287871 A1 | 11/2010 | Bloom et al. |
| 2010/0300867 A1 | 12/2010 | Kim et al. |
| 2010/0314234 A1 | 12/2010 | Knoch et al. |
| 2011/0000284 A1 | 1/2011 | Kumar et al. |
| 2011/0014406 A1 | 1/2011 | Coleman et al. |
| 2011/0048917 A1 | 3/2011 | Kim et al. |
| 2011/0083314 A1 | 4/2011 | Baird |
| 2011/0088600 A1 | 4/2011 | McRae |
| 2011/0120852 A1 | 5/2011 | Kim |
| 2011/0144406 A1 | 6/2011 | Masatsugu et al. |
| 2011/0168482 A1 | 7/2011 | Merchant et al. |
| 2011/0174301 A1 | 7/2011 | Haydock et al. |
| 2011/0192395 A1 | 8/2011 | Kim |
| 2011/0198206 A1 | 8/2011 | Kim et al. |
| 2011/0223088 A1 | 9/2011 | Chang et al. |
| 2011/0253521 A1 | 10/2011 | Kim |
| 2011/0291827 A1 | 12/2011 | Baldocchi et al. |
| 2011/0313218 A1 | 12/2011 | Dana |
| 2011/0315538 A1 | 12/2011 | Kim et al. |
| 2012/0024688 A1 | 2/2012 | Barkdoll |
| 2012/0030998 A1 | 2/2012 | Barkdoll et al. |
| 2012/0031076 A1 | 2/2012 | Frank et al. |
| 2012/0125709 A1 | 5/2012 | Merchant et al. |
| 2012/0152720 A1 | 6/2012 | Reichelt et al. |
| 2012/0177541 A1 | 7/2012 | Mutsuda et al. |
| 2012/0179421 A1 | 7/2012 | Dasgupta |
| 2012/0180133 A1 | 7/2012 | Ai-Harbi et al. |
| 2012/0228115 A1 | 9/2012 | Westbrook |
| 2012/0247939 A1 | 10/2012 | Kim et al. |
| 2012/0305380 A1 | 12/2012 | Wang et al. |
| 2012/0312019 A1 | 12/2012 | Rechtman |
| 2013/0020781 A1 | 1/2013 | Kishikawa |
| 2013/0045149 A1 | 2/2013 | Miller |
| 2013/0216717 A1 | 8/2013 | Rago et al. |
| 2013/0220373 A1 | 8/2013 | Kim |
| 2013/0306462 A1 | 11/2013 | Kim et al. |
| 2014/0033917 A1 | 2/2014 | Rodgers et al. |
| 2014/0039833 A1 | 2/2014 | Sharpe, Jr. et al. |
| 2014/0061018 A1 | 3/2014 | Sarpen et al. |
| 2014/0083836 A1 | 3/2014 | Quanci et al. |
| 2014/0156584 A1 | 6/2014 | Motukuri et al. |
| 2014/0182195 A1 | 7/2014 | Quanci et al. |
| 2014/0182683 A1 | 7/2014 | Quanci et al. |
| 2014/0183023 A1 | 7/2014 | Quanci et al. |
| 2014/0208997 A1 | 7/2014 | Alferyev et al. |
| 2014/0224123 A1 | 8/2014 | Walters |
| 2014/0262139 A1 | 9/2014 | Choi et al. |
| 2014/0262726 A1 | 9/2014 | West et al. |
| 2015/0122629 A1 | 5/2015 | Freimuth et al. |
| 2015/0143908 A1 | 5/2015 | Cetinkaya |
| 2015/0175433 A1 | 6/2015 | Micka et al. |
| 2015/0219530 A1 | 8/2015 | Li et al. |
| 2015/0226499 A1* | 8/2015 | Mikkelsen .................. F27D 7/06 29/890.054 |
| 2015/0247092 A1 | 9/2015 | Quanci et al. |
| 2015/0361346 A1 | 12/2015 | West et al. |
| 2015/0361347 A1 | 12/2015 | Ball et al. |
| 2016/0026193 A1 | 1/2016 | Rhodes et al. |
| 2016/0048139 A1 | 2/2016 | Samples et al. |
| 2016/0149944 A1 | 5/2016 | Obermeirer et al. |
| 2016/0154171 A1 | 6/2016 | Kato et al. |
| 2016/0186063 A1 | 6/2016 | Quanci et al. |
| 2016/0186064 A1 | 6/2016 | Quanci et al. |
| 2016/0186065 A1 | 6/2016 | Quanci et al. |
| 2016/0222297 A1 | 8/2016 | Choi et al. |
| 2016/0319197 A1 | 11/2016 | Quanci et al. |
| 2016/0319198 A1 | 11/2016 | Quanci et al. |
| 2017/0015908 A1 | 1/2017 | Quanci et al. |
| 2017/0182447 A1 | 6/2017 | Sappok et al. |
| 2017/0183569 A1 | 6/2017 | Quanci et al. |
| 2017/0253803 A1 | 9/2017 | West et al. |
| 2017/0261417 A1 | 9/2017 | Zhang |

(56) References Cited

U.S. PATENT DOCUMENTS

| | | | |
|---|---|---|---|
| 2017/0313943 | A1 | 11/2017 | Valdevies |
| 2017/0352243 | A1 | 12/2017 | Quanci et al. |
| 2018/0340122 | A1 | 11/2018 | Crum et al. |
| 2019/0099708 | A1 | 4/2019 | Quanci |
| 2019/0161682 | A1 | 5/2019 | Quanci et al. |
| 2019/0169503 | A1 | 6/2019 | Chun et al. |
| 2019/0317167 | A1 | 10/2019 | LaBorde et al. |
| 2019/0352568 | A1 | 11/2019 | Quanci et al. |
| 2020/0071190 | A1 | 3/2020 | Wiederin et al. |
| 2020/0139273 | A1 | 5/2020 | Badiei |
| 2020/0173679 | A1 | 6/2020 | O'Reilly et al. |
| 2021/0130697 | A1 | 5/2021 | Quanci et al. |
| 2021/0163821 | A1 | 6/2021 | Quanci et al. |
| 2021/0163822 | A1 | 6/2021 | Quanci et al. |
| 2021/0163823 | A1 | 6/2021 | Quanci et al. |
| 2021/0198579 | A1 | 7/2021 | Quanci et al. |

FOREIGN PATENT DOCUMENTS

| | | |
|---|---|---|
| CA | 2822841 | 7/2012 |
| CA | 2822857 | 7/2012 |
| CA | 2905110 A1 | 9/2014 |
| CN | 87212113 U | 6/1988 |
| CN | 87107195 A | 7/1988 |
| CN | 2064363 U | 10/1990 |
| CN | 2139121 Y | 7/1993 |
| CN | 1092457 A | 9/1994 |
| CN | 1255528 A | 6/2000 |
| CN | 1270983 A | 10/2000 |
| CN | 2528771 Y | 2/2002 |
| CN | 1358822 A | 7/2002 |
| CN | 2521473 Y | 11/2002 |
| CN | 1468364 A | 1/2004 |
| CN | 1527872 A | 9/2004 |
| CN | 2668641 | 1/2005 |
| CN | 1957204 A | 5/2007 |
| CN | 101037603 A | 9/2007 |
| CN | 101058731 A | 10/2007 |
| CN | 101157874 A | 4/2008 |
| CN | 101211495 A | 7/2008 |
| CN | 201121178 Y | 9/2008 |
| CN | 101395248 A | 3/2009 |
| CN | 100510004 C | 7/2009 |
| CN | 101486017 A | 7/2009 |
| CN | 201264981 Y | 7/2009 |
| CN | 101497835 A | 8/2009 |
| CN | 101509427 A | 8/2009 |
| CN | 101886466 A | 11/2010 |
| CN | 101910530 A | 12/2010 |
| CN | 102072829 A | 5/2011 |
| CN | 102155300 A | 8/2011 |
| CN | 2509188 Y | 11/2011 |
| CN | 202226816 | 5/2012 |
| CN | 202265541 U | 6/2012 |
| CN | 102584294 A | 7/2012 |
| CN | 202415446 U | 9/2012 |
| CN | 202470353 U | 10/2012 |
| CN | 103399536 A | 11/2013 |
| CN | 103468289 A | 12/2013 |
| CN | 103913193 A | 7/2014 |
| CN | 203981700 U | 12/2014 |
| CN | 105137947 A | 12/2015 |
| CN | 105189704 A | 12/2015 |
| CN | 105264448 A | 1/2016 |
| CN | 105467949 A | 4/2016 |
| CN | 106661456 A | 5/2017 |
| CN | 106687564 A | 5/2017 |
| CN | 107445633 A | 12/2017 |
| CN | 100500619 C | 6/2020 |
| DE | 201729 C | 9/1908 |
| DE | 212176 | 7/1909 |
| DE | 1212037 B | 3/1966 |
| DE | 2720688 A1 | 11/1978 |
| DE | 3231697 C1 | 1/1984 |
| DE | 3328702 A1 | 2/1984 |
| DE | 3315738 C2 | 3/1984 |
| DE | 3329367 C | 11/1984 |
| DE | 3407487 C1 | 6/1985 |
| DE | 19545736 | 6/1997 |
| DE | 19803455 | 8/1999 |
| DE | 10122531 A1 | 11/2002 |
| DE | 10154785 | 5/2003 |
| DE | 102005015301 | 10/2006 |
| DE | 102006004669 | 8/2007 |
| DE | 102006026521 | 12/2007 |
| DE | 102009031436 | 1/2011 |
| DE | 102011052785 | 12/2012 |
| EP | 0126399 A1 | 11/1984 |
| EP | 0208490 | 1/1987 |
| EP | 0903393 A2 | 3/1999 |
| EP | 1538503 A1 | 6/2005 |
| EP | 2295129 | 3/2011 |
| EP | 2468837 A1 | 6/2012 |
| FR | 2339664 | 8/1977 |
| FR | 2517802 | 6/1983 |
| FR | 2764978 | 12/1998 |
| GB | 364236 A | 1/1932 |
| GB | 368649 A | 3/1932 |
| GB | 441784 | 1/1936 |
| GB | 606340 | 8/1948 |
| GB | 611524 | 11/1948 |
| GB | 725865 | 3/1955 |
| GB | 871094 | 6/1961 |
| GB | 923205 A | 5/1963 |
| JP | S50148405 | 11/1975 |
| JP | S5319301 A | 2/1978 |
| JP | 54054101 | 4/1979 |
| JP | S5453103 A | 4/1979 |
| JP | 57051786 | 3/1982 |
| JP | 57051787 | 3/1982 |
| JP | 57083585 | 5/1982 |
| JP | 57090092 | 6/1982 |
| JP | S57172978 A | 10/1982 |
| JP | 58091788 | 5/1983 |
| JP | 59051978 | 3/1984 |
| JP | 59053589 | 3/1984 |
| JP | 59071388 | 4/1984 |
| JP | 59108083 | 6/1984 |
| JP | 59145281 | 8/1984 |
| JP | 60004588 | 1/1985 |
| JP | 61106690 | 5/1986 |
| JP | 62011794 | 1/1987 |
| JP | 62285980 | 12/1987 |
| JP | 01103694 | 4/1989 |
| JP | 01249886 | 10/1989 |
| JP | H0319127 | 3/1991 |
| JP | 03197588 | 8/1991 |
| JP | 04159392 | 6/1992 |
| JP | H04178494 A | 6/1992 |
| JP | H05230466 A | 9/1993 |
| JP | H0649450 A | 2/1994 |
| JP | H0654753 U | 7/1994 |
| JP | H06264062 | 9/1994 |
| JP | H06299156 A | 10/1994 |
| JP | 07188668 | 7/1995 |
| JP | 07216357 | 8/1995 |
| JP | H07204432 | 8/1995 |
| JP | H08104875 A | 4/1996 |
| JP | 08127778 | 5/1996 |
| JP | H10273672 A | 10/1998 |
| JP | H11-131074 | 5/1999 |
| JP | H11256166 A | 9/1999 |
| JP | 2000204373 A | 7/2000 |
| JP | 2000219883 A | 8/2000 |
| JP | 2001055576 A | 2/2001 |
| JP | 2001200258 | 7/2001 |
| JP | 2002097472 A | 4/2002 |
| JP | 2002106941 | 4/2002 |
| JP | 2003041258 | 2/2003 |
| JP | 2003051082 A | 2/2003 |
| JP | 2003071313 A | 3/2003 |
| JP | 2003292968 A | 10/2003 |
| JP | 2003342581 A | 12/2003 |
| JP | 2004169016 A | 6/2004 |

(56) References Cited

FOREIGN PATENT DOCUMENTS

| | | |
|---|---|---|
| JP | 2005503448 A | 2/2005 |
| JP | 2005135422 A | 5/2005 |
| JP | 2005154597 A | 6/2005 |
| JP | 2005263983 A | 9/2005 |
| JP | 2005344085 A | 12/2005 |
| JP | 2006188608 A | 7/2006 |
| JP | 2007063420 A | 3/2007 |
| JP | 4101226 B2 | 6/2008 |
| JP | 2008231278 A | 10/2008 |
| JP | 2009019106 A | 1/2009 |
| JP | 2009073864 A | 4/2009 |
| JP | 2009073865 A | 4/2009 |
| JP | 2009135276 A | 6/2009 |
| JP | 2009144121 | 7/2009 |
| JP | 2010229239 A | 10/2010 |
| JP | 2010248389 A | 11/2010 |
| JP | 2011504947 A | 2/2011 |
| JP | 2011068733 A | 4/2011 |
| JP | 2011102351 A | 5/2011 |
| JP | 2012102302 | 5/2012 |
| JP | 2013006957 A | 1/2013 |
| JP | 2013510910 | 3/2013 |
| JP | 2013189322 A | 9/2013 |
| JP | 2014040502 A | 3/2014 |
| JP | 2015094091 A | 5/2015 |
| JP | 2016169897 A | 9/2016 |
| KR | 1019960008754 | 10/1996 |
| KR | 19990017156 U | 5/1999 |
| KR | 1019990054426 | 7/1999 |
| KR | 20000042375 A | 7/2000 |
| KR | 100296700 B1 | 10/2001 |
| KR | 20030012458 A | 2/2003 |
| KR | 1020040020883 A | 3/2004 |
| KR | 20040107204 A | 12/2004 |
| KR | 1020050053861 A | 6/2005 |
| KR | 20060132336 A | 12/2006 |
| KR | 100737393 B1 | 7/2007 |
| KR | 100797852 | 1/2008 |
| KR | 20080069170 A | 7/2008 |
| KR | 20110010452 A | 2/2011 |
| KR | 101314288 | 4/2011 |
| KR | 20120033091 A | 4/2012 |
| KR | 20130050807 | 5/2013 |
| KR | 101318388 | 10/2013 |
| KR | 20140042526 A | 4/2014 |
| KR | 20150011084 A | 1/2015 |
| KR | 20170038102 A | 4/2017 |
| KR | 20170058808 A | 5/2017 |
| KR | 20170103857 A | 9/2017 |
| KR | 101862491 B1 | 5/2018 |
| RU | 2083532 C1 | 7/1997 |
| RU | 2441898 C2 | 2/2012 |
| RU | 2493233 C2 | 9/2013 |
| SU | 1535880 A1 | 1/1990 |
| TW | 201241166 A1 | 10/2012 |
| TW | 201245431 A1 | 11/2012 |
| UA | 50580 | 10/2002 |
| WO | WO9012074 | 10/1990 |
| WO | WO9945083 | 9/1999 |
| WO | WO02062922 | 8/2002 |
| WO | WO2005023649 | 3/2005 |
| WO | WO2005031297 | 4/2005 |
| WO | WO2005115583 | 12/2005 |
| WO | WO2007103649 | 9/2007 |
| WO | WO2008034424 | 3/2008 |
| WO | WO2008105269 | 9/2008 |
| WO | WO2011000447 | 1/2011 |
| WO | WO2011126043 | 10/2011 |
| WO | WO2012029979 | 3/2012 |
| WO | WO2012031726 | 3/2012 |
| WO | WO2013023872 | 2/2013 |
| WO | WO2010107513 | 9/2013 |
| WO | WO2014021909 | 2/2014 |
| WO | WO2014043667 | 3/2014 |
| WO | WO2014105064 | 7/2014 |
| WO | WO2014153050 | 9/2014 |
| WO | WO2016004106 | 1/2016 |
| WO | WO2016033511 | 3/2016 |
| WO | WO2016086322 | 6/2016 |

OTHER PUBLICATIONS

U.S. Appl. No. 07/878,904, filed May 6, 1992, now U.S. Pat. No. 5,318,671, titled Method of Operation of Nonrecovery Coke Oven Battery.

U.S. Appl. No. 09/783,195, filed Feb. 14, 2001, now U.S. Pat. No. 6,596,128, titled Coke Oven Flue Gas Sharing.

U.S. Appl. No. 07/886,804, filed May 22, 1992, now U.S. Pat. No. 5,228,955, titled High Strength Coke Oven Wall Having Gas Flues Therein.

U.S. Appl. No. 08/059,673, filed May 12, 1993, now U.S. Pat. No. 5,447,606, titled Method of and Apparatus for Capturing Coke Oven Charging Emissions.

U.S. Appl. No. 08/914,140, filed Aug. 19, 1997, now U.S. Pat. No. 5,928,476, titled Nonrecovery Coke Oven Door.

U.S. Appl. No. 09/680,187, filed Oct. 5, 2000, now U.S. Pat. No. 6,290,494, titled Method and Apparatus for Coal Coking.

U.S. Appl. No. 10/933,866, filed Sep. 3, 2004, now U.S. Pat. No. 7,331,298, titled Coke Oven Rotary Wedge Door Latch.

U.S. Appl. No. 11/424,566, filed Jun. 16, 2006, now U.S. Pat. No. 7,497,930, titled Method and Apparatus for Compacting Coal for a Coal Coking Process.

U.S. Appl. No. 12/405,269, filed Mar. 17, 2009, now U.S. Pat. No. 7,998,316, titled Flat Push Coke Wet Quenching Apparatus and Process.

U.S. Appl. No. 13/205,960, filed Aug. 9, 2011, now U.S. Pat. No. 9,321,965, titled Flat Push Coke Wet Quenching Apparatus and Process.

U.S. Appl. No. 11/367,236, filed Mar. 3, 2006, now U.S. Pat. No. 8,152,670, titled Method and Apparatus for Producing Coke.

U.S. Appl. No. 12/403,391, filed Mar. 13, 2009, now U.S. Pat. No. 8,172,930, titled Cleanable In Situ Spark Arrestor.

U.S. Appl. No. 12/849,192, filed Aug. 3, 2010, now U.S. Pat. No. 9,200,225, titled Method and Apparatus for Compacting Coal for a Coal Coking Process.

U.S. Appl. No. 13/631,215, filed Sep. 28, 2012, now U.S. Pat. No. 9,683,740, titled Methods for Handling Coal Processing Emissions and Associated Systems and Devices.

U.S. Appl. No. 13/730,692, filed Dec. 28, 2012, now U.S. Pat. No. 9,193,913, titled Reduced Output Rate Coke Oven Operation With Gas Sharing Providing Extended Process Cycle.

U.S. Appl. No. 14/921,723, filed Oct. 23, 2015, titled Reduced Output Rate Coke Oven Operation With Gas Sharing Providing Extended Process Cycle.

U.S. Appl. No. 14/655,204, filed Jun. 24, 2015, titled Systems and Methods for Removing Mercury From Emissions.

U.S. Appl. No. 16/000,516, filed Jun. 5, 2018, titled Systems and Methods for Removing Mercury From Emissions.

U.S. Appl. No. 13/830,971, filed Mar. 14, 2013, now U.S. Pat. No. 10,047,296, titled Non-Perpendicular Connections Between Coke Oven Uptakes and a Hot Common Tunnel, and Associated Systems and Methods, now U.S. Pat. No. 10,047,295.

U.S. Appl. No. 16/026,363, filed Jul. 3, 2018, titled Non-Perpendicular Connections Between Coke Oven Uptakes and a Hot Common Tunnel, and Associated Systems and Methods.

U.S. Appl. No. 13/730,796, filed Dec. 28, 2012, titled Methods and Systems for Improved Coke Quenching.

U.S. Appl. No. 13/730,598, filed Dec. 28, 2012, now U.S. Pat. No. 9,238,778, titled Systems and Methods for Improving Quenched Coke Recovery.

U.S. Appl. No. 14/952,267, filed Nov. 25, 2015, now U.S. Pat. No. 9,862,888, titled Systems and Methods for Improving Quenched Coke Recovery.

U.S. Appl. No. 15/830,320, filed Dec. 4, 2017, now U.S. Pat. No. 10,323,192, titled Systems and Methods for Improving Quenched Coke Recovery.

(56) References Cited

OTHER PUBLICATIONS

U.S. Appl. No. 13/730,735, filed Dec. 28, 2012, now U.S. Pat. No. 9,273,249, titled Systems and Methods for Controlling Air Distribution in a Coke Oven.
U.S. Appl. No. 14/655,013, filed Jun. 23, 2015, titled Vent Stack Lids and Associated Systems and Methods.
U.S. Appl. No. 13/843,166, now U.S. Pat. No. 9,273,250, filed Mar. 15, 2013, titled Methods and Systems for Improved Quench Tower Design.
U.S. Appl. No. 15/014,547, filed Feb. 3, 2016, titled Methods and Systems for Improved Quench Tower Design.
U.S. Appl. No. 14/655,003, filed Jun. 23, 2015, titled Systems and Methods and Maintaining a Hot Car in a Coke Plant.
U.S. Appl. No. 13/829,588, now U.S. Pat. No. 9,193,915, filed Mar. 14, 2013, titled Horizontal Heat Recovery Coke Ovens Having Monolith Crowns.
U.S. Appl. No. 15/322,176, filed Dec. 27, 2016, now U.S. Appl. No. 10,526,541, titled Horizontal Heat Recovery Coke Ovens Having Monolith Crowns.
U.S. Appl. No. 15/511,036, filed Mar. 14, 2017, titled Coke Ovens Having Monolith Component Construction.
U.S. Appl. No. 16/704,689, filed Dec. 5, 2019, titled Horizontal Heat Recovery Coke Ovens Having Monolith Crowns.
U.S. Appl. No. 13/589,009, filed Aug. 17, 2012, titled Automatic Draft Control System for Coke Plants.
U.S. Appl. No. 15/139,568, filed Apr. 27, 2016, titled Automatic Draft Control System for Coke Plants.
U.S. Appl. No. 13/588,996, now U.S. Pat. No. 9,243,186, filed Aug. 17, 2012, titled Coke Plant Including Exhaust Gas Sharing.
U.S. Appl. No. 14/959,450, filed Dec. 4, 2015, now U.S. Pat. No. 10,041,002, titled Coke Plant Including Exhaust Gas Sharing, now U.S. Pat. No. 10,041,002.
U.S. Appl. No. 16/047,198, filed Jul. 27, 2018, titled Coke Plant Including Exhaust Gas Sharing.
U.S. Appl. No. 13/589,004, now U.S. Pat. No. 9,249,357, filed Aug. 17, 2012, titled Method and Apparatus for Volatile Matter Sharing in Stamp-Charged Coke Ovens.
U.S. Appl. No. 13/730,673, filed Dec. 28, 2012, titled Exhaust Flow Modifier, Duct Intersection Incorporating the Same, and Methods Therefor.
U.S. Appl. No. 15/281,891, filed Sep. 30, 2016, titled Exhaust Flow Modifier, Duck Intersection Incorporating the Same, and Methods Therefor.
U.S. Appl. No. 13/598,394, now U.S. Pat. No. 9,169,439, filed Aug. 29, 2012, titled Method and Apparatus for Testing Coal Coking Properties.
U.S. Appl. No. 14/865,581, filed Sep. 25, 2015, now Pat. No. 10,053,627, titled Method and Apparatus for Testing Coal Coking Properties, now U.S. Pat. No. 10,053,627.
U.S. Appl. No. 14/839,384, filed Aug. 28, 2015, titled Coke Oven Charging System.
U.S. Appl. No. 15/443,246, now U.S. Pat. No. 9,976,089, filed Feb. 27, 2017, titled Coke Oven Charging System.
U.S. Appl. No. 14/587,670, filed Dec. 31, 2014, titled Methods for Decarbonizing Coking Ovens, and Associated Systems and Devices.
U.S. Appl. No. 14/984,489, filed Dec. 30, 2015, titled Multi-Modal Beds of Coking Material.
U.S. Appl. No. 14/983,837, filed Dec. 30, 2015, titled Multi-Modal Beds of Coking Material.
U.S. Appl. No. 14/986,281, filed Dec. 31, 2015, titled Multi-Modal Beds of Coking Material.
U.S. Appl. No. 14/987,625, filed Jan. 4, 2016, titled Integrated Coke Plant Automation and Optimization Using Advanced Control and Optimization Techniques.
U.S. Appl. No. 14/839,493, filed Aug. 28, 2015, now U.S. Pat. No. 10,233,392, titled Method and System for Optimizing Coke Plant Operation and Output.
U.S. Appl. No. 16/251,352, filed Jan. 18, 2019, titled Method and System for Optimizing Coke Plant Operation and Output.
U.S. Appl. No. 14/839,551, filed Aug. 28, 2015, now U.S. Pat. No. 10/308,876, titled Burn Profiles for Coke Operations.
U.S. Appl. No. 16/428,014, filed May 31, 2019, titled Improved Burn Profiles for Coke Operations.
U.S. Appl. No. 14/839,588, filed Aug. 28, 2015, now U.S. Pat. No. 9,708,542, titled Method and System for Optimizing Coke Plant Operation and Output.
U.S. Appl. No. 15/392,942, filed Dec. 28, 2016, now U.S. Pat. No. 10,526,542, titled Method and System for Dynamically Charging a Coke Oven.
U.S. Appl. No. 16/735,103, filed Jan. 6, 2020, titled Method and System for Dynamically Charging a Coke Oven.
U.S. Appl. No. 15/614,525, filed Jun. 5, 2017, titled Methods and Systems for Automatically Generating a Remedial Action in an Industrial Facility.
U.S. Appl. No. 15/987,860, filed May 23, 2018, titled System and Method for Repairing a Coke Oven.
U.S. Appl. No. 16/729,053, filed Dec. 27, 2019, titled Oven Uptakes.
U.S. Appl. No. 16/729,036, filed Dec. 27, 2019, titled Systems and Methods for Treating a Surface of a Coke Plant.
U.S. Appl. No. 16/729,201, filed Dec. 27, 2019, titled Gaseous Tracer Leak Detection.
U.S. Appl. No. 16/729,122, filed Dec. 27, 2019, titled Methods and Systems for Providing Corrosion Resistant Surfaces in Contaminant Treatment Systems.
U.S. Appl. No. 16/729,129, filed Dec. 27, 2019, titled Coke Plant Tunnel Repair and Flexible Joints.
U.S. Appl. No. 16/729,170, filed Dec. 27, 2019, titled Coke Plant Tunnel Repair and Anchor Distribution.
U.S. Appl. No. 16/729,157, filed Dec. 27, 2019, titled Particulate Detection for Industrial Facilities, and Associated Systems and Methods.
U.S. Appl. No. 16/729,057, filed Dec. 27, 2019, titled Decarbonization of Coke Ovens and Associated Systems and Methods.
U.S. Appl. No. 16/729,212, filed Dec. 27, 2019, titled Heat Recovery Oven Foundation.
U.S. Appl. No. 16/729,219, filed Dec. 27, 2019, titled Spring-Loaded Heat Recovery Oven System and Method.
U.S. Appl. No. 16/428,014, filed May 31, 2019, Quanci et al.
U.S. Appl. No. 16/704,689, filed Dec. 5, 2019, West et al.
U.S. Appl. No. 16/729,036, filed Dec. 27, 2019, Quanci et al.
U.S. Appl. No. 16/729,053, filed Dec. 27, 2019, Quanci et at.
U.S. Appl. No. 16/729,057, filed Dec. 27, 2019, Quanci et at.
U.S. Appl. No. 16/729,122, filed Dec. 27, 2019, Quanci et al.
U.S. Appl. No. 16/729,129, filed Dec. 27, 2019, Quanci et at.
U.S. Appl. No. 16/729,157, filed Dec. 27, 2019, Quanci et at.
U.S. Appl. No. 16/729,170, filed Dec. 27, 2019, Quanci et at.
U.S. Appl. No. 16/729,201, filed Dec. 27, 2019, Quanci et al.
U.S. Appl. No. 16/729,212, filed Dec. 27, 2019, Quanci et al.
U.S. Appl. No. 16/729,219, filed Dec. 27, 2019, Quanci et at.
U.S. Appl. No. 16/735,103, filed Jan. 6, 2020, Quanci et al.
ASTM D5341-99(2010)e1, Standard Test Method for Measuring Coke Reactivity Index (CRI) and Coke Strength After Reaction (CSR), ASTM International, West Conshohocken, PA, 2010.
Astrom, et al., "Feedback Systems: An Introduction for Scientists and Engineers," Sep. 16, 2006, available on line at http://people/duke.edu/-hpgavin/SystemID/References/Astrom-Feedback-2006.pdf ; 404 pages.
Basset et al., "Calculation of steady flow pressure loss coefficients for pipe junctions," Proc Instn Mech Engrs., vol. 215, Part C, p. 861-881 IMechIE 2001.
Beckman et al., "Possibilities and limits of cutting back coking plant output," Stahl Und Eisen, Verlag Stahleisen, Dusseldorf, DE, vol. 130, No. 8, Aug. 16, 2010, pp. 57-67.
Bloom, et al., "Modular cast block—The future of coke oven repairs," Iron & Steel Technol, AIST, Warrendale, PA, vol. 4, No. 3, Mar. 1, 2007, pp. 61-64.
Boyes, Walt. (2003), Instrumentation Reference Book (3rd Edition)—34.7.4.6 Infrared and Thermal Cameras, Elsevier. Online version available at: https://app.knovel.com/hotlink/pdf/id:kt004QMGV6/instrumentation-reference-2/ditigal-video.

(56) References Cited

OTHER PUBLICATIONS

Clean coke process: process development studies by USS Engineers and Consultants, Inc., Wisconsin Tech Search, request date Oct. 5, 2011, 17 pages.
"Conveyor Chain Designer Guild", Mar. 27, 2014 (date obtained from wayback machine), Renold.com, Section 4, available online at: http://www.renold/com/upload/renoldswitzerland/conveyor_chain_-_designer_guide.pdf.
Costa, et al., "Edge Effects on the Flow Characteristics in a 90 deg Tee Junction," Transactions of the ASME, Nov. 2006, vol. 128, pp. 1204-1217.
Crelling, et al., "Effects of Weathered Coal on Coking Properties and Coke Quality", Fuel, 1979, vol. 58, Issue 7, pp. 542-546.
Database WPI, Week 199115, Thomson Scientific, Lond, GB; AN 1991-107552.
Diez, et al., "Coal for Metallurgical Coke Production: Predictions of Coke Quality and Future Requirements for Cokemaking", International Journal of Coal Geology, 2002, vol. 50, Issue 1-4, pp. 389-412.
Industrial Furnace Design Handbook, Editor-in-Chief: First Design Institute of First Ministry of Machinery Industry, Beijing: Mechanical Industry Press, pp. 180-183, Oct. 1981.
Joseph, B., "A tutorial on inferential control and its applications," Proceedings of the 1999 American Control Conference (Cat. No. 99CH36251), San Diego, CA, 1999, pp. 3106-3118 vol. 5.
JP 03-197588, Inoue Keizo et al., Method and Equipment for Boring Degassing Hole in Coal Charge in Coke Oven, Japanese Patent (Abstract Only) Aug. 28, 1991.
JP 04-159392, Inoue Keizo et al., Method and Equipment for Opening Hole for Degassing of Coal Charge in Coke Oven, Japanese Patent (Abstract Only) Jun. 2, 1992.
Kerlin, Thomas (1999), Practical Thermocouple Thermometry—1.1 The Thermocouple. ISA. Online version available at https:app.knovel.com/pdf/id:kt007XPTM3/practical-thermocouple/the-thermocouple.
Kochanski et al., "Overview of Uhde Heat Recovery Cokemaking Technology," AISTech Iron and Steel Technology Conference Proceedings, Association for Iron and Steel Technology, U.S., vol. 1, Jan. 1, 2005, pp. 25-32.
Knoerzer et al. "Jewell-Thompson Non-Recovery Cokemaking", Steel Times, Fuel & Metallurgical Journals LTD. London, GB, vol. 221, No. 4, Apr. 1, 1993, pp. 172-173, 184.
Madias, et al., "A review on stamped charging of coals" (2013). Available at https://www.researchgate.net/publication/263887759_A_review_on_stamped_charging_of_coals.
Metallurgical Coke MSDS, ArcelorMittal, May 30, 2011, available online at http://dofasco.arcelormittal.com/-/media/Files/A/Arcelormittal-Canada/material-safety/metallurgical-coke.pdf.
"Middletown Coke Company HRSG Maintenance BACT Analysis Option 1—Individual Spray Quenches Sun Heat Recovery Coke Facility Process Flow Diagram Middletown Coke Company 100 Oven Case #1—24.5 VM", (Sep. 1, 2009), URL: http://web.archive.org/web/20090901042738/http://epa.ohio.gov/portals/27/transfer/ptiApplication/mcc/new/262504.pdf, (Feb. 12, 2016), XP055249803 [X] 1-13 * p. 7 * * pp. 8-11 *.
Practical Technical Manual of Refractories, Baoyu Hu, etc., Beijing: Metallurgical Industry Press, Chapter 6; 2004, 6-30.
Refractories for Ironmaking and Steelmaking: A History of Battles over High Temperatures; Kyoshi Sugita (Japan, Shaolin Zhang), 1995, p. 160, 2004, 2-29.
"Resources and Utilization of Coking Coal in China," Mingxin Shen ed., Chemical Industry Press, first edition, Jan. 2007, pp. 242-243, 247.
Rose, Harold J., "The Selection of Coals for the Manufacture of Coke," American Institute of Mining and Metallurgical Engineers, Feb. 1926, 8 pages.
Waddell, et al., "Heat-Recovery Cokemaking Presentation," Jan. 1999, pp. 1-25.
Walker, et al., "Sun Coke Company's heat recovery cokemaking technology high coke quality and low environmental impact", Revue De Metallurgie—Cahiers D'Informations Techniques, Revue De Metallurgie. Paris, FR, (Mar. 1, 2003), vol. 100, No. 3, ISSN 0035-1563, p. 23.
Westbrook, "Heat-Recovery Cokemaking at Sun Coke," AISE Steel Technology, Pittsburg, PA, vol. 76, No. 1, Jan. 1999, pp. 25-28.
"What is dead-band control," forum post by user "wireaddict" on AllAboutCircuits.com message board, Feb. 8, 2007, accessed Oct. 24, 2018 at https:/forum.allaboutcircuits.com/threads/what-is-dead-band-control.4728/; 8 pages.
Yu et al., "Coke Oven Production Technology," Lianoning Science and Technology Press, first edition, Apr. 2014, pp. 356-358.
U.S. Appl. No. 17/155,818, filed Jan. 22, 2021, Choi et al.
U.S. Appl. No. 17/190,720, filed Mar. 3, 2021, West et al.
U.S. Appl. No. 17/191,119, filed Mar. 3, 2021, Quanci et al.
U.S. Appl. No. 17/222,886, filed Apr. 5, 2021, Quanci et al.
U.S. Appl. No. 17/228,469, filed Apr. 12, 2021, Quanci et al.
U.S. Appl. No. 17/228,501, filed Apr. 12, 2021, Quanci et al.
U.S. Appl. No. 17/306,895, filed May 3, 2021, Quanci et al.
U.S. Appl. No. 17/321,857, filed May 17, 2021, Quanci et al.
U.S. Appl. No. 17/320,343, filed May 24, 2021, Quanci et al.
U.S. Appl. No. 16/828,448, filed Mar. 24, 2020, Quanci et al.
U.S. Appl. No. 16/845,530, filed Apr. 10, 2020, Quanci et al.
U.S. Appl. No. 16/897,957, filed Jun. 10, 2020, Ball et al.
U.S. Appl. No. 17/076,563, filed Oct. 21, 2020, Crum et al.
International Search Report and Written Opinion for PCT/US2019/068808; dated Apr. 28, 2020; 13 pages.
U.S. Appl. No. 17/388,874, filed Jul. 29, 2021, Quanci et al.
U.S. Appl. No. 17/459,380, filed Aug. 27, 2021, Quanci et al.
U.S. Appl. No. 17/471,491, filed Sep. 10, 2021, West et al.
U.S. Appl. No. 17/521,061, filed Nov. 8, 2021, Crum et al.
U.S. Appl. No. 17/526,477, filed Nov. 15, 2021, Quanci et al.
U.S. Appl. No. 17/532,058, filed Nov. 22, 2021, Quanci et al.
U.S. Appl. No. 17/584,672, filed Jan. 26, 2022, Quanci et al.

* cited by examiner

SYSTEMS AND METHODS FOR UTILIZING FLUE GAS

CROSS-REFERENCE TO RELATED APPLICATION

This non-provisional patent application claims the benefit of and priority to U.S. Provisional Patent Application No. 62/787,116, titled "IMPROVED HEAT RECOVERY STEAM GENERATOR" and filed Dec. 31, 2018, which is incorporated by reference herein in its entirety by reference thereto.

TECHNICAL FIELD

The present technology relates to systems for processing and utilizing flue gas produced in industrial process, such as flue gas produced by coke ovens during the coking process.

BACKGROUND

Heat recovery steam generators (HRSG) are used in many industrial processes as a means for recovering heat from hot gas streams. Generally speaking, a HRSG is used to produce steam (including superheated steam), which can then be used for a variety of different purposes around an industrial facility. One specific industry that uses HRSGs is the coke manufacturing industry, though HRSGs are also used in, for example, trash-to-steam processes, biomass processing, black liquor processing, and in the processing of other mixed feeds (such as coal and biomass).

With respect to the use of HRSGs in coke manufacturing facilities, and specifically with respect to the use of HRSGs in cokemaking heat recovery facilities, volatile gases emitted during the coking process are directed out of the coke oven and eventually pass into a flue gas desulfurization system, which is used to reduce the acidity and neutralize acids present within the flue gas, and a baghouse, which collects particulate matter within the flue gas, before the flue gas is vented into the atmosphere. In comparison to flue gases exhausted from coal burning power plants, flue gases exhausted from heat recovery coke ovens typically have much higher concentrations of acids, and in particular, hydrochloric acid. For example, flue gas exhausted from heat recovery coke ovens can sometimes have a concentration of hydrochloric acid that is 10 times higher (or more) than flue gas exhausted from coal burning power plants. This is primarily because heat recovery coke plants extract 80-90% of all of the chlorides in the coal while only burning about 25% of the coal and all of this is expelled from the oven as volatile matter during the coking process.

However, the volatile gases expelled from the coke oven typically have a temperature between 1500 and 2200° F., which is too hot to be properly processed by the desulfurization system and the baghouse. Accordingly, before the flue gas can be directed into the desulfurization system and the baghouse, the flue gases pass through a heat recovery steam generator, which helps to cool the flue gases by absorbing heat from the gas and using the heat to convert liquid water into steam, which can then be used to generate power using a steam turbine.

Regardless of the specific context in which the HRSG is used, when exhaust gas begins to cool within the HRSG, vaporized contaminants within the gas condense and precipitate onto the tubes within the HRSG that carry the water and steam. These condensed contaminants are often extremely corrosive to the steel tubes and can cause the tubes to quickly corrode and become damaged. Accordingly, there is a need for an improved heat recovery steam generator that offers increased resistance to corrosion caused by contaminants within flue gases.

DETAILED DESCRIPTION

Specific details of several embodiments of the disclosed technology are described below with reference to particular, representative configurations. The disclosed technology is also described herein with reference to HRSGs used in coke manufacturing plants. However, it should be appreciated that the technology described herein is not limited to this specific application. For example, HRSG and related technology described herein can be implemented in any industrial process where exhaust gas is processed to cool the exhaust gas and/or utilize exhaust gas heat for steam production. Accordingly, the technology described herein should not be considered as limited to coke manufacturing processes.

In some non-limiting embodiments the disclosed technology can be practiced in accordance with ovens, coke manufacturing facilities, and insulation and heat shielding structures having other suitable configurations. Specific details describing structures or processes that are well-known and often associated with coke ovens but that can unnecessarily obscure some significant aspects of the presently disclosed technology, are not set forth in the following description for clarity. Moreover, although the following disclosure sets forth some embodiments of the different aspects of the disclosed technology, some embodiments of the technology can have configurations and/or components different than those described in this section. As such, the present technology can include some embodiments with additional elements and/or without several of the elements described below with reference to FIGS. 1-20.

Figure 1:
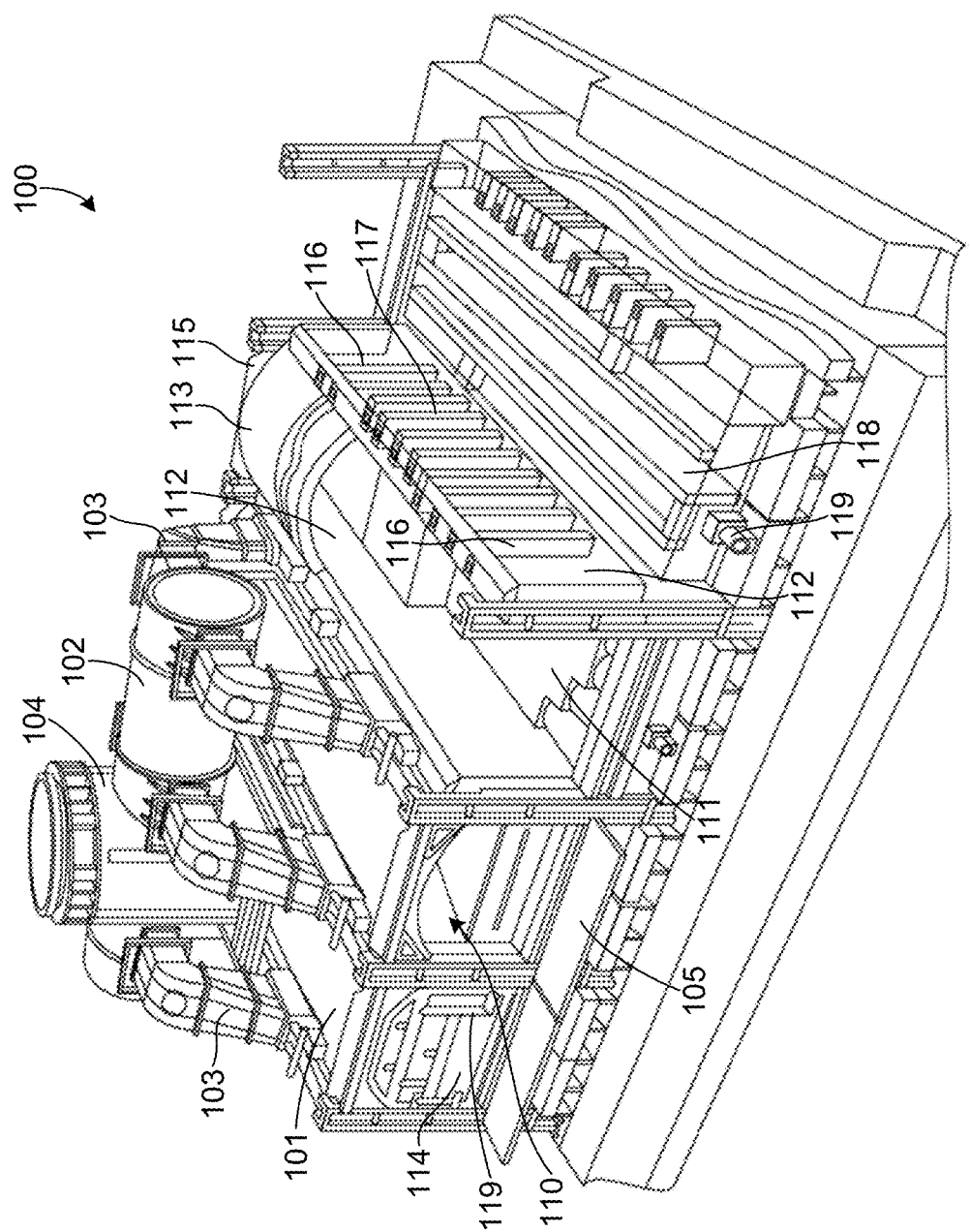
FIG. 1 is an isometric, partial cut-away view of a portion of a horizontal heat recovery/non-recovery coke plant configured in accordance with embodiments of the present technology.

Referring to FIG. 1, a coke plant 100 is illustrated which produces coke from coal in a reducing environment. FIG. 1 illustrates four ovens 101 with sections cut away for clarity. Each oven 101 comprises an oven chamber 110 preferably defined by a floor 111, a front door 114, a rear door 115 preferably opposite the front door 114, two sidewalls 112 extending upwardly from the floor 111 intermediate the front 114 and rear 115 doors, and a crown 113 which forms the top surface of the oven chamber 110. The oven 101 can also include a platform 105 adjacent to the front door 114 that a worker can stand and walk on to access the front door and the oven chamber 110. In operation, coke is produced in the ovens 101 by first loading coal into the oven chamber 110, heating the coal in an oxygen depleted environment, driving off the volatile fraction of coal and then oxidizing the volatiles within the oven 101 to capture and utilize the heat given off. The coal volatiles are oxidized within the ovens over a 48-hour coking cycle and release heat to regeneratively drive the carbonization of the coal to coke. The coking cycle begins when the front door 114 is opened and coal is charged onto the floor 111. The coal on the floor 111 is known as the coal bed. Heat from the oven (due to the previous coking cycle) starts the carbonization cycle. Preferably, no additional fuel other than that produced by the coking process is used. Roughly half of the total heat transfer to the coal bed is radiated down onto the top surface of the coal bed from the luminous flame and radiant oven crown 113. The remaining half of the heat is transferred to the coal bed by conduction from the floor 111 which is convectively heated from the volatilization of gases in sole flue 118. In this way, a carbonization process "wave" of plastic flow of the coal particles and formation of high strength cohesive coke proceeds from both the top and bottom boundaries of the coal bed at the same rate, preferably meeting at the center of the coal bed after about 45-48 hours.

In operation, volatile gases emitted from the coal positioned inside the oven chamber 110 (also referred to herein as flue gases) collect in the crown 113 and are drawn downstream in the overall system into downcomer channels 117 formed in one or both sidewalls 112. The downcomer channels 117 fluidly connect the oven chamber 110 with the sole flue 118 positioned under the floor 111. The sole flue 118 forms a circuitous path beneath the floor 111 and volatile gases emitted from the coal can pass through the downcomer channels 117 and enter the sole flue 118, where they combust and emit heat that supports the reduction of coal into coke. Uptake channels 116 are formed in one or both sidewalls 112 of the oven chambers 110 and are fluidly coupled between the sole flue 118 and uptake ducts 103 such that the combusted volatile gases can leave the sole flue 118 by passing through the uptake channels 116 toward the uptake ducts 103. The uptake ducts 103 direct the volatile gases into the common tunnel 102, which transports these gases downstream for further processing.

Figure 2:
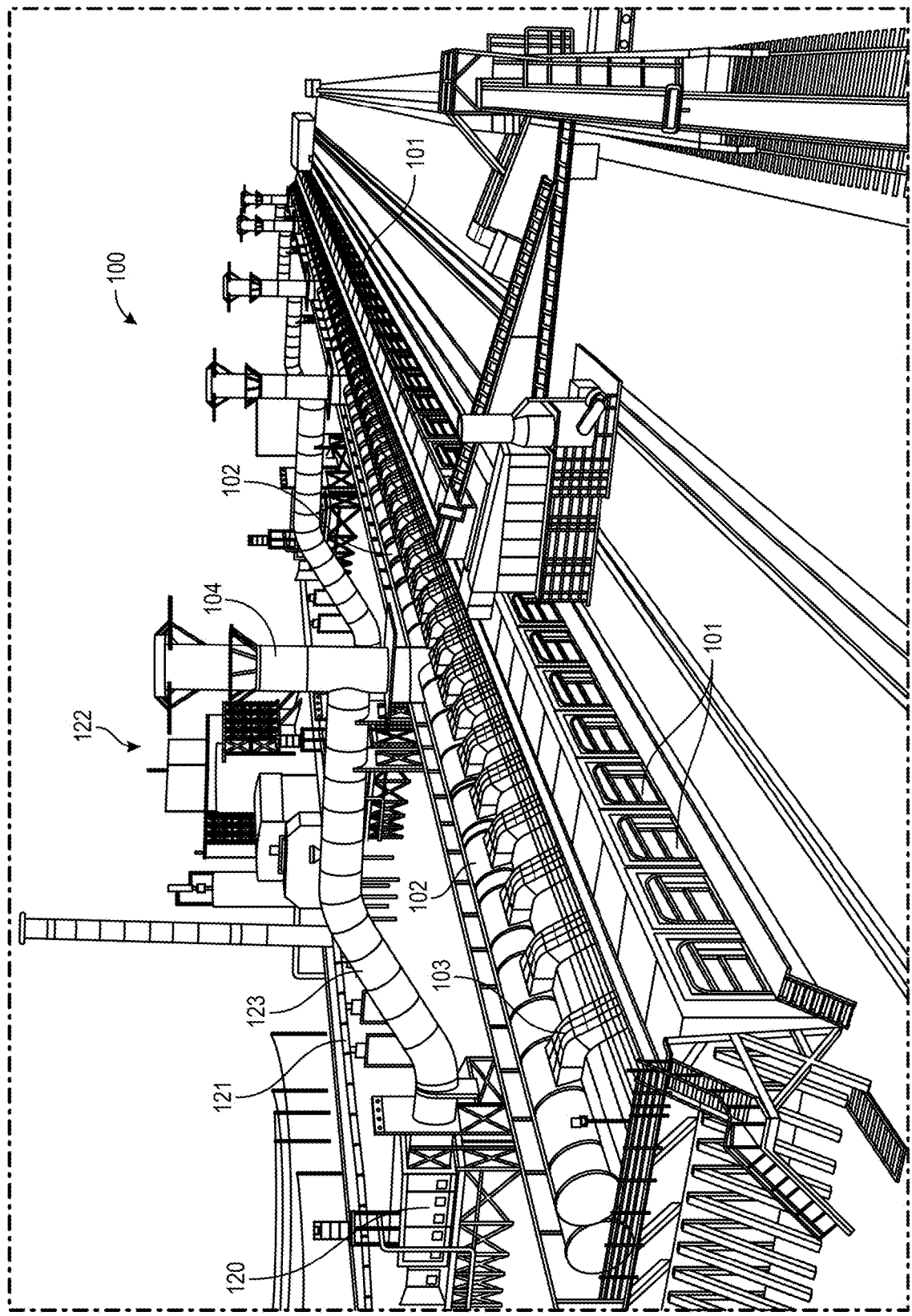
FIG. 2 is a perspective view a coke plant configured in accordance with embodiments of the present technology.

FIG. 2 shows a perspective view of the coke plant 100. After passing into the common tunnel 102 from the uptake ducts 103, the common tunnel 102 directs the flue gases to one or more heat recovery steam generators (HRSG) 120, which cools the flue gas by using the heat from the flue gas to convert liquid water into steam. A cooled gas duct 121 transports the cooled gas from the HRSG 120 to a flue gas desulfurization system 122, which is used to reduce the acidity and neutralize acids present within the flue gas. Fluidly connected and further downstream are a baghouse for collecting particulates, at least one draft fan for controlling air pressure within the system, and a main gas stack for exhausting cooled, treated exhaust to the environment. Steam lines interconnect the heat recovery steam generators and a cogeneration plant so that the recovered heat can be utilized. The coke plant 100 can also be fluidly connected to a bypass exhaust stack 104 that can be used to vent hot exhaust gases to the atmosphere in emergency situations.

Figure 3:
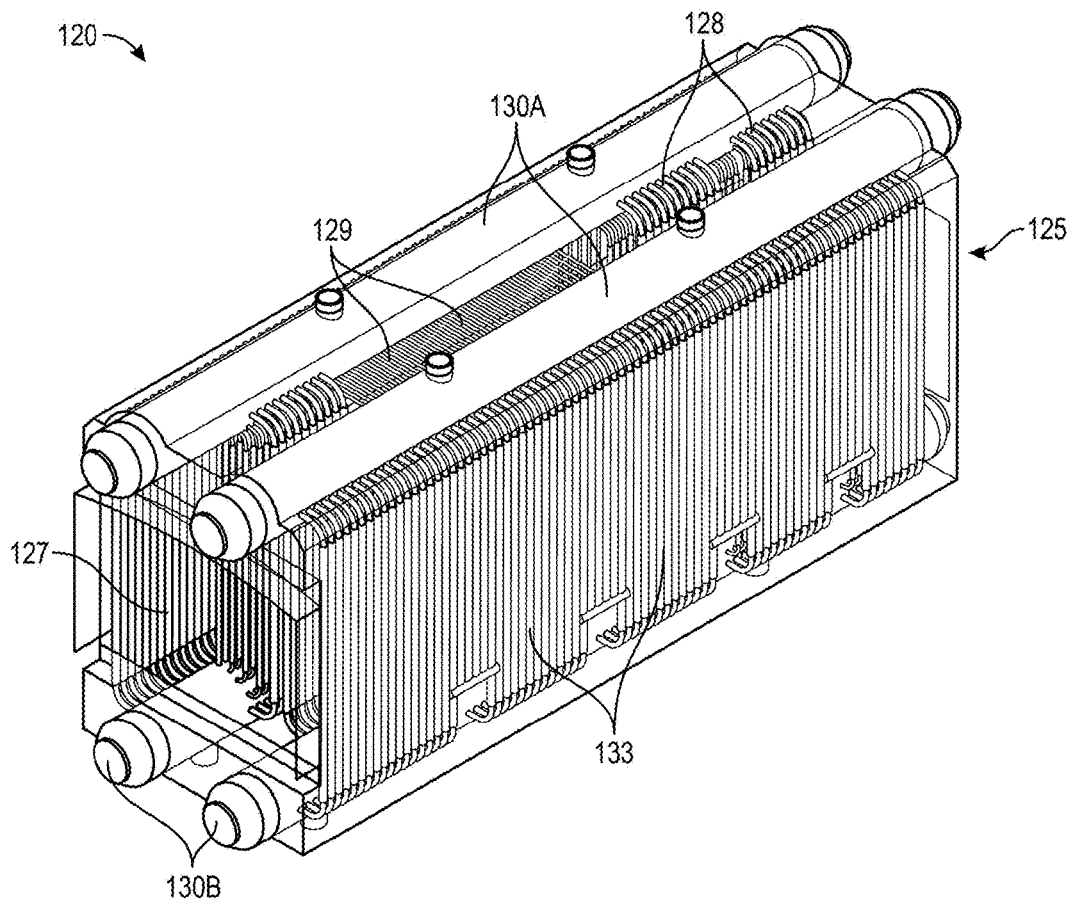
FIG. 3 shows an isometric view of an illustrative HRSG configured in accordance with embodiments of the present technology.
Figure 4:
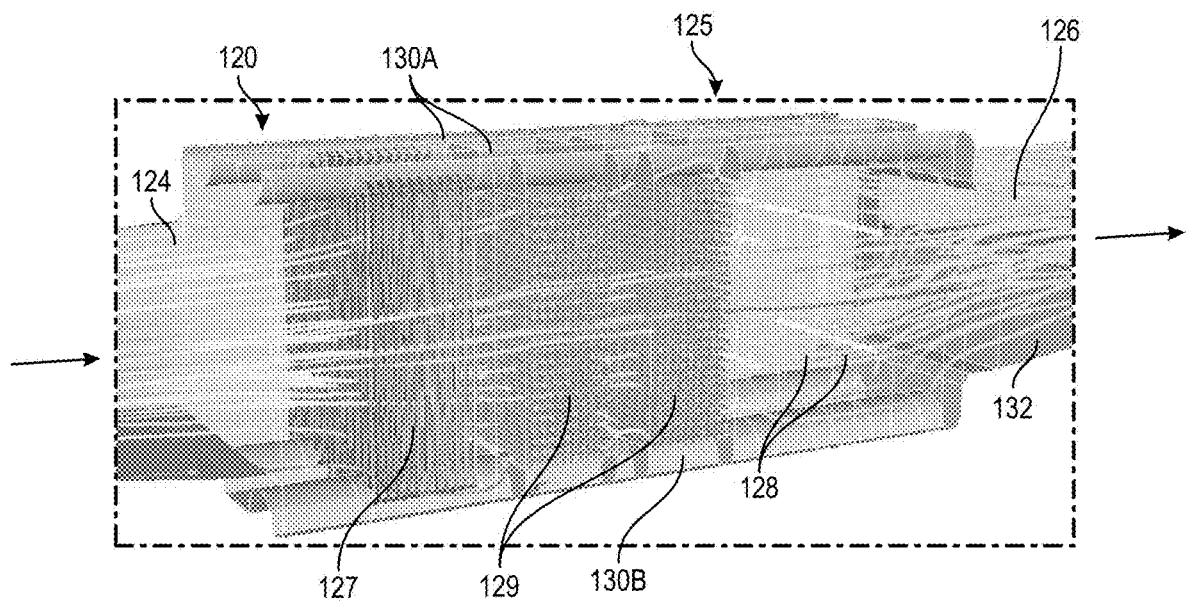
FIG. 4 shows a diagram of the flow path of flue gases passing through the HRSG, in accordance with embodiments of the present technology.

FIG. 3 shows an isometric view of an illustrative HRSG 120 and FIG. 4 shows a diagram of the flow path of the flue gases through the HRSG 120. The HRSG 120 includes an inlet duct 124 configured to receive hot flue gases from a cross-over tunnel 123 (FIG. 2) that is coupled to the common tunnel 102 (FIG. 2). The flue gases enter the HRSG 120 and pass through an inlet damper (not labeled) positioned adjacent to the inlet duct 124, which can be used to control the flow of the flue gases into the HRSG 120, and into a radiation chamber (not labeled), which can be used to address gas flow distribution and to allow the flue gases to cool sufficiently so that any molten species within the flue gas can solidify. The HRSG 120 includes a steam generation system 125 that uses the heat and thermal energy of the hot flue gas to vaporize liquid water within the steam generation system 125 into steam and then superheat the steam. In some embodiments, the superheated steam is provided to a steam turbine that uses the superheated steam to generate electricity. In other embodiments, the superheated steam is provided to other systems for other purposes.

In the illustrated embodiment, the steam generation system 125 includes an economizer 126, a primary evaporator 127, two secondary evaporators 128, two superheaters 129, steam drums 130A and mud drums 130B, and a waterwall 133. As the flue gas flows through the HRSG 120, heat from the flue gas can be transferred to each of the different components of the steam generation system 125. In this way, the temperature of the flue gas can decrease as it flows through the HRSG 120. For example, when the flue gas is first received at the inlet duct 124, the flue gas can have a temperature between 800 and 2500° F. As the flue gases pass through the HRSG 120, the flue gases can be cooled by the various components of the HRSG 120 such that, when the flue gas exits the HRSG 120 via the outlet duct 132 and is directed into the cooled gas duct 121, the flue gas can have a temperature between 300 and 600° F., and specifically to a temperature between 375 and 500° F. However, these temperatures are only examples. The specific flue gas temperatures measured at the inlet duct 123 and the outlet duct 132 are dependent on the specific operating conditions and design of the HRSG 120 and other components of the coke plant.

As the flue gas passes and transfers heat to the various components of the steam generation system 125, these components absorb the thermal energy from the flue gas, causing their temperature to increase. In this way, the flue gas can be used to heat water within the various components of the steam generation system 125 to create steam. For example, during operation of the steam generation system 125, feedwater is provided to economizer 126. The feedwater is typically provided to the economizer 126 at a temperature of approximately 270° F. However, the feedwater can be highly pressurized such that, even at this elevated temperature, the feedwater does not boil. As the hot flue gases flow past the economizer 126, at least some of the thermal energy of the flue gases can be absorbed by the economizer 126 and by the feedwater within the economizer 126. As a result, the feedwater within the economizer 126 can be heated to temperatures greater than 270° F. The heated feedwater is then directed into a drum for temporary storage before being directed into the primary and secondary evaporators 127 and 128. As the heated feedwater flows through the evaporators 127 and 128, heat from the hot flue gases flowing by the evaporators 127/128 can be transferred into the evaporators 127 and 128, which can in turn heat up the liquid water to a sufficiently high enough temperature that the water evaporates into steam. The steam is then directed into a drum for temporary storage before being directed into the superheaters 129. As the steam flows through the superheaters 129, heat from the flue gas can be absorbed by the superheaters 129, which can cause the steam within the superheaters 129 to become superheated. Once superheated, the steam can then be directed out of the HRSG for further use.

Figure 5A:
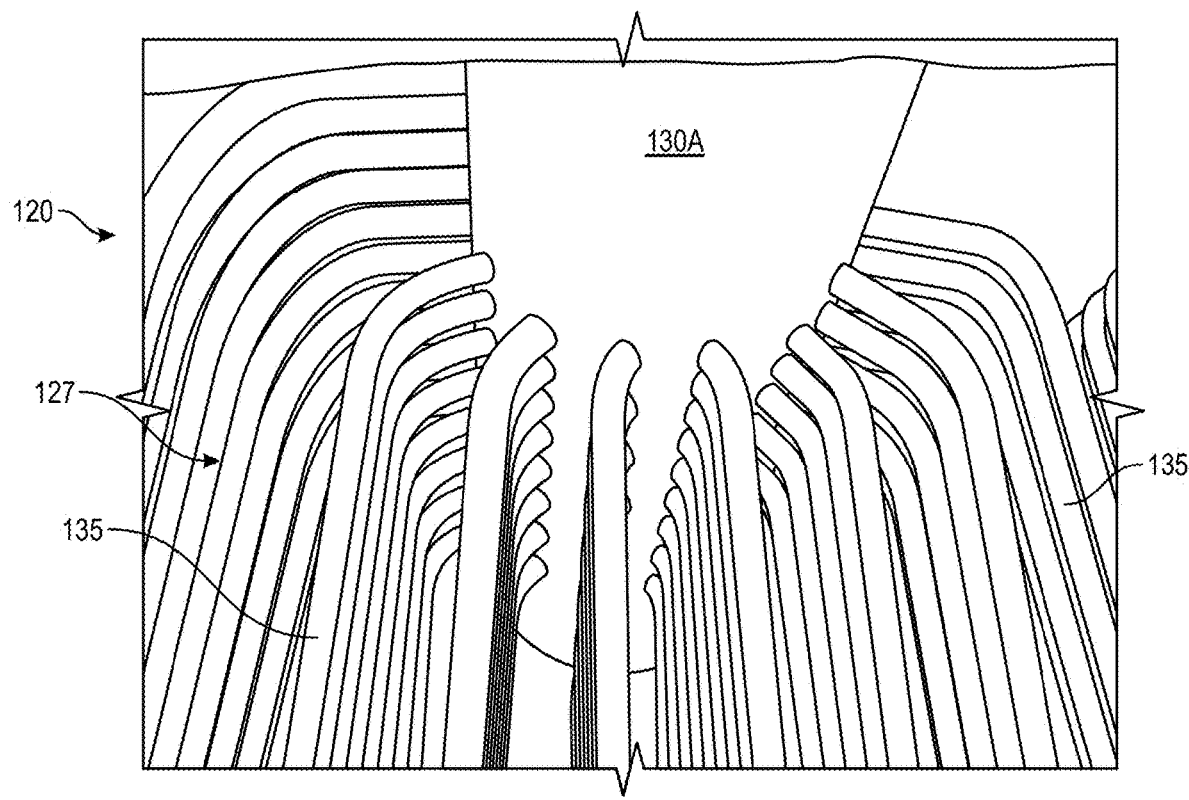
FIGS. 5A and 5B show isometric views of the top and bottom portions of a primary evaporator configured in accordance with embodiments of the present technology.
Figure 5B:
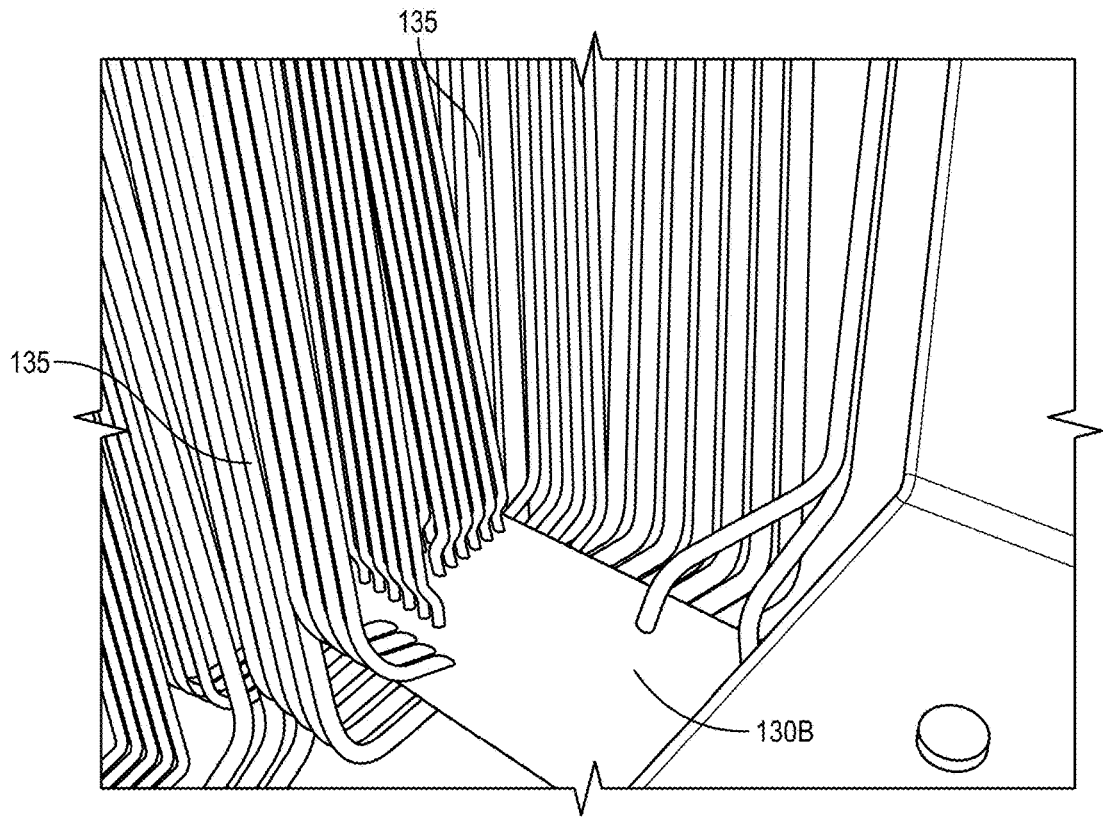

In the embodiments shown in FIGS. 3 and 4, after the flue gas passes through the inlet duct 124, the flue gases first flow through the primary evaporator 127. FIGS. 5A and 5B show isometric views of the top and bottom portions of the primary evaporator 127. The primary evaporator 127 includes a plurality of evaporator tubes 135 that are generally vertically oriented and are fluidly coupled in parallel between the mud drum 130B and the steam drum 130A. As the liquid water flows through the evaporator tubes 135, the hot flue gases pass through the primary evaporator 127 and flow around the individual evaporator tubes 135. This can cause the flue gases to transfer thermal energy into each of the evaporator tubes 135, causing the individual evaporator tubes 135 to heat up. In some embodiments, the evaporator tubes 135 can be heated to temperatures from 500° F. to over 1000° F. However, these temperatures are only examples and the specific temperatures experienced by the various components of the heat recovery steam generator are dependent on the specific design and operating conditions of the heat recovery steam generator and other components of the coke plant (or other industrial plant). The evaporator tubes 135, which can be formed from metal, can then transfer at least some of this absorbed thermal energy into the water flowing through the evaporator tubes 135, causing the liquid water to heat up and evaporate into steam.

The secondary evaporators 128, which are positioned further downstream from the primary evaporator 127, can also include evaporator tubes 135 that are generally vertically oriented and that are fluidly coupled in parallel between the mud drum 130B and the steam drum 130A such that heat from the flue gas can be absorbed by the evaporator tubes 135 of the secondary evaporators 128 and liquid water flowing through the secondary evaporators 128 can be evaporated into steam. However, because the secondary evaporators 128 are positioned further downstream from the primary evaporator 127, the flue gas that passes through the secondary evaporators 128 can be cooler than the flue gas passing through the primary evaporator 127. For example, the flue gas passing by the secondary evaporator may only be approximately 730° F. To ensure that sufficient thermal energy is transferred to the evaporator tubes 135 of the secondary evaporators 128, the secondary evaporators 128 can include more evaporator tubes 135 than the primary evaporator 127 and the evaporator tubes 135 of the secondary evaporators 128 can be more densely packed together. In this way, it is more difficult for the flue gases to flow through the secondary evaporators 128 and the amount of thermal energy transferred into the evaporator tubes 135, and therefore the amount of heat transferred into the liquid water within these tubes 135 can be sufficiently high enough to cause the liquid water to evaporate into steam.

Figure 6A:
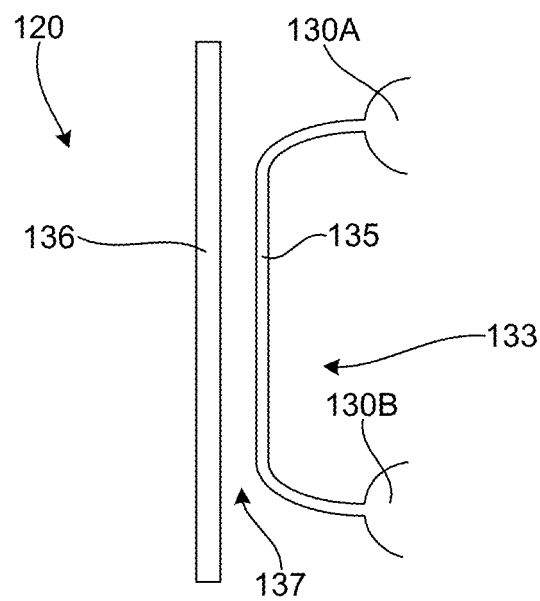
FIG. 6A shows a diagram of a portion of a waterwall and FIG. 6B shows an isometric view of an exterior wall of the HRSG, in accordance with embodiments of the present technology.
Figure 6B:
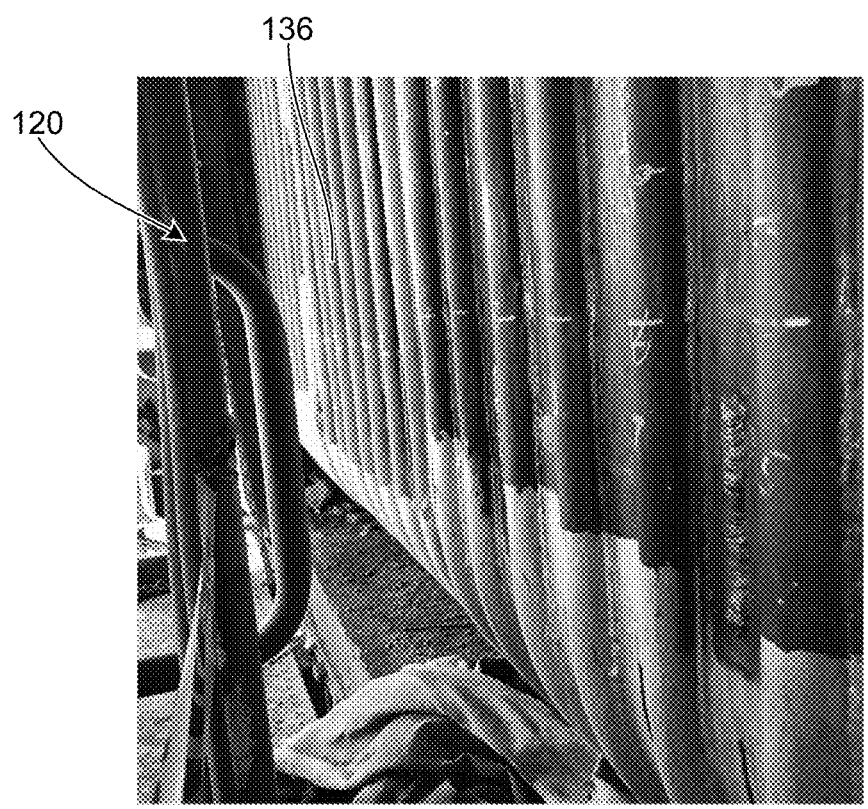

In some embodiments, the HRSG 120 can also include a waterwall 133 (FIGS. 6A and 6B) that is configured to thermally protect exterior portions of the HRSG 120 from the heat given off by the flue gases flowing through the HRSG 120. In these embodiments, at least some of the evaporator tubes 135 can be positioned adjacent to exterior walls of the HRSG 120 such that these evaporator tubes 135 can absorb heat from the flue gas near the exterior walls instead of the heat being absorbed by the walls. For example, FIG. 6A shows a diagram of a portion of a waterwall 133 and FIG. 6B shows an exterior view of an exterior wall 136 of the HRSG 120. The evaporator tube 135 extends between the mud drum 130B and the steam drum 130A and is positioned adjacent to the exterior wall 136, though separated from the exterior wall 136 by a gap 137. In this way, the evaporator tube 135 can be positioned between the exterior wall 136 and the flue gas and can therefore reduce the heat of the flue gas that reaches the exterior wall 136. As a result, the waterwall can prevent the exterior wall 136 from being heated to an undesirably high temperature and the temperature within the gap 137 can be lower than the temperature on the other side of the waterwall 133.

After the liquid water evaporates into steam, the evaporator tubes 135 direct the steam out of the primary and secondary evaporators 127 and 128 and into the steam drum 130A. The steam drums 130A extend along a top of the HRSG 120 and fluidly couple the evaporators 127 and 128 to the superheaters 129. Further, the steam drums 130A can be sufficiently pressurized such that the steam within the steam drums 130A can be saturated.

Figure 7B:
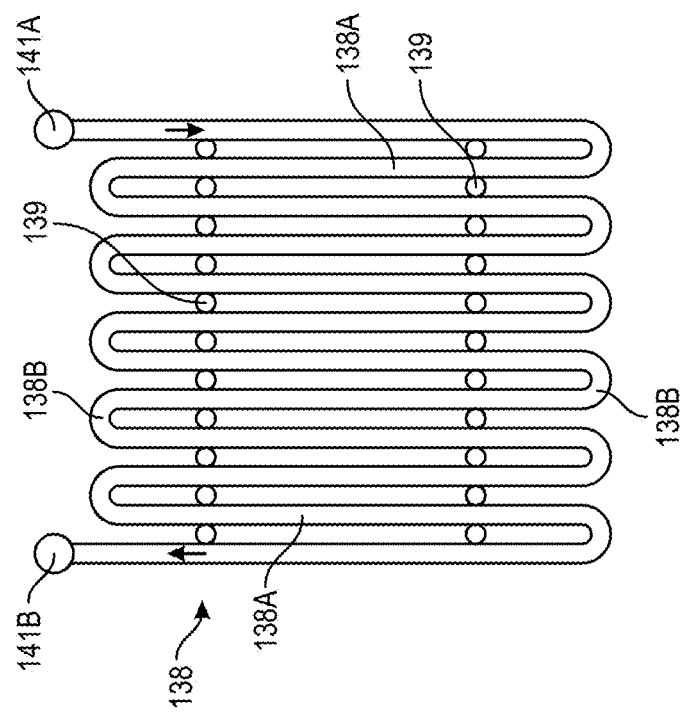
FIGS. 7A and 7B show diagrams of a superheater configured in accordance with embodiments of the present technology.
Figure 7A:
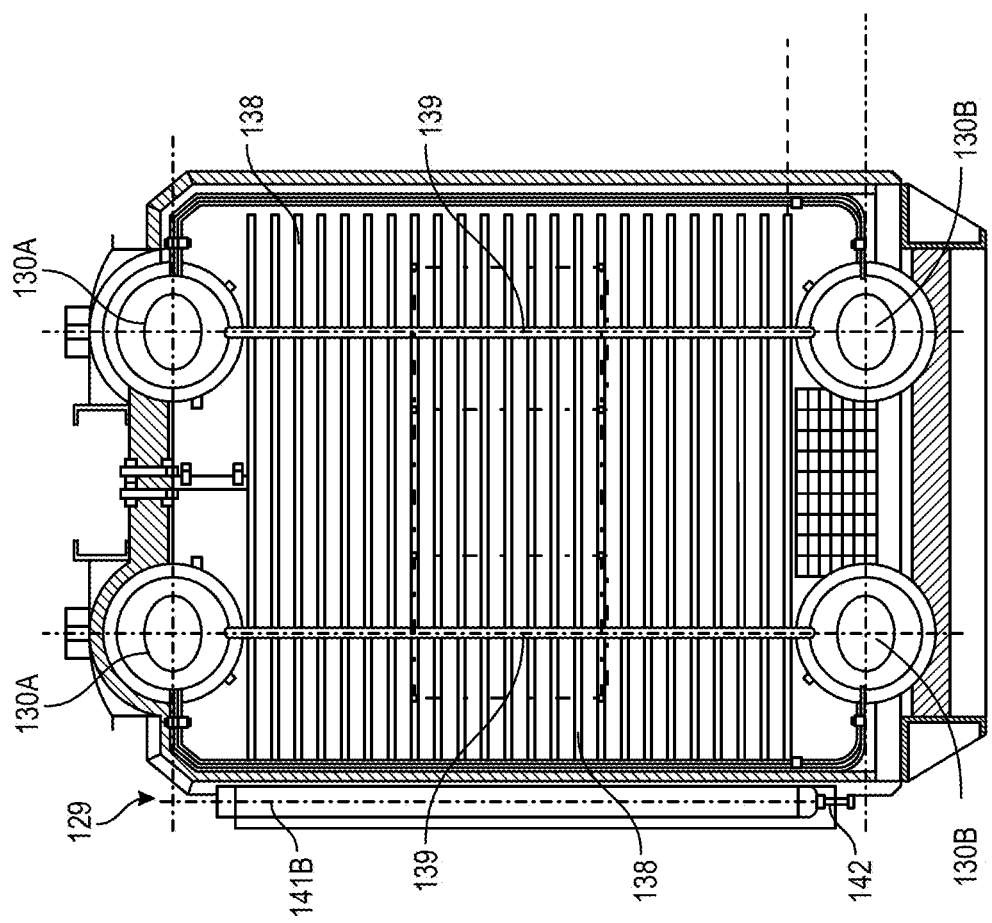

After passing by the primary evaporator 127, the flue gases flow toward superheaters 129. The HRSG 120 can be configured to provide steam to a steam turbine that uses the steam to generate electricity. However, if the steam provided to the steam turbine is at too low of a pressure and/or temperature, the steam turbine can become damaged. Accordingly, before the saturated steam within the steam drum 130A can be provided to the steam turbine, superheaters 129 can take the saturated steam from the steam drums 130A to superheat and pressurize the steam. FIG. 7A shows a front elevation view one of the superheaters 129 and FIG. 7B shows a top plan view of a single superheater tube 138. Each of the superheaters 129 includes a plurality of generally horizontal superheater tubes 138 stacked on top of each other and fluidly coupled together. Each of the superheater tubes 138 has a plurality of straight segments 138A and a plurality of curved segments 138B that form end portions of the tubes and that couple adjacent straight segments 138A together. With this arrangement, each of the superheater tubes 138 can have a generally serpentine configuration.

During operation of the superheaters 129, steam within the steam drums 130A is directed into each of the superheater tubes 138 by a tube 141A. As the steam flows through the superheater tubes 138 by following the serpentine path, hot flue gases within the HRSG 120 can flow over the individual superheater tubes 138, thereby causing the individual superheater tubes 138 to heat up until the temperature of the outer surface of the superheater tubes 138 reaches temperatures between about 500° F. and 1000° F. The superheater tubes 138, which are typically formed from metal, can then transfer at least some of this absorbed thermal energy to the steam flowing through the superheater tubes 138, thereby causing the steam to become superheated. Once the superheated steam reaches the end of the superheater tube 138, the superheated steam is directed out of the superheater 129 and into tube 141B, which directs the steam out of the HRSG 120 via nozzle 142. The superheated steam can then be provided to the steam turbine.

Figure 7C:
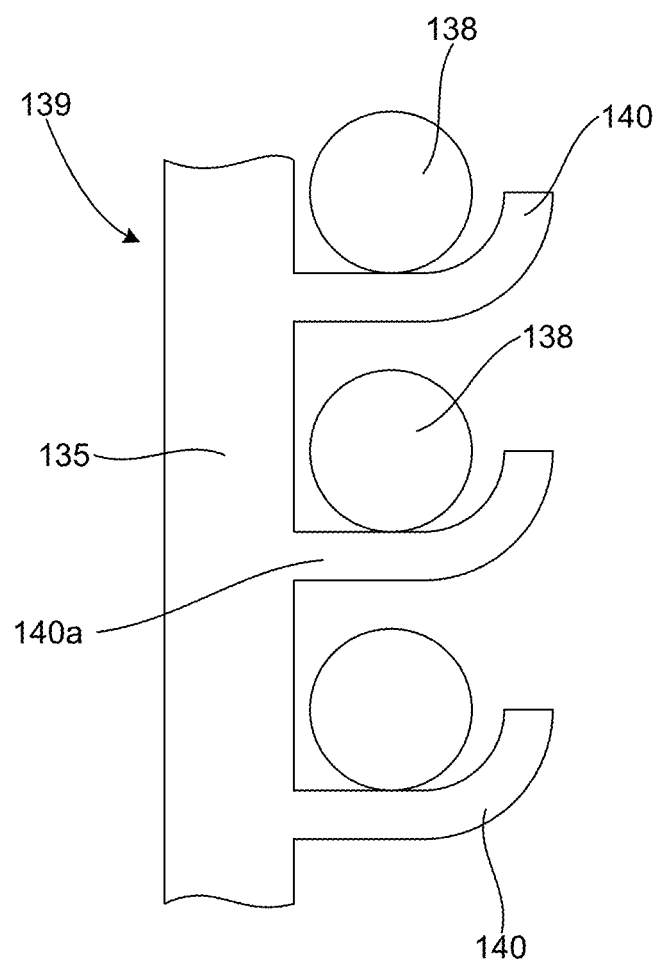
FIG. 7C shows a diagram of a vertical support tube for the superheater of FIGS. 7A and 7B and configured in accordance with embodiments of the present technology.

To support the generally horizontal superheater tubes 138, the HRSG 120 can include a plurality of vertical support tubes 139. The vertical support tubes 139 are generally vertically oriented and each includes a plurality of fins projecting horizontally such that the horizontal superheater tubes 138 can rest on the fins. As shown in FIG. 7C, each of the vertical support tubes 139 include an evaporator tube 135 and a plurality of fins 140 welded to the evaporator tube 135 such that fins 140 extend away from the evaporator tube 135 and can support one of the superheater tubes 138. While FIG. 7C shows the fins 140 having a upwardly curved terminal end, the fins 140 may have other shapes, such as straight fins that project horizontally with no upward curve at the terminal end.

During operation of the HRSG 120, the flue gases flowing through the HRSG 120 can be hot enough to soften and weaken the metal that forms the vertical support tubes 139, which can potentially cause damage to the superheater 129. However, because the evaporator tube 135 includes water and steam flowing therethrough, the water and steam can absorb enough of the heat absorbed by the vertical support tubes 139 to cool the vertical support tubes 139 down so that the metal remains sufficiently strong.

In the embodiment shown in FIGS. 3 and 4, the steam generation system 125 includes two superheaters 129. In some embodiments, the two superheaters 129 can be fluidly coupled together in series. In these embodiments, one of the superheaters 129 receives steam from the steam drums 130A, at least partially superheats the steam, and provides the at least partially superheated steam to the second superheater 129, which continues to heat the at least partially superheated steam until the steam is fully superheated. The superheated steam is then directed out of the HRSG 120. In other embodiments, however, the two superheaters 129 are not fluidly coupled together and superheat the steam independent from each other. In still other embodiments, the steam generation system may only include one superheater 129, or may include more than two superheaters 129.

Figure 8A:
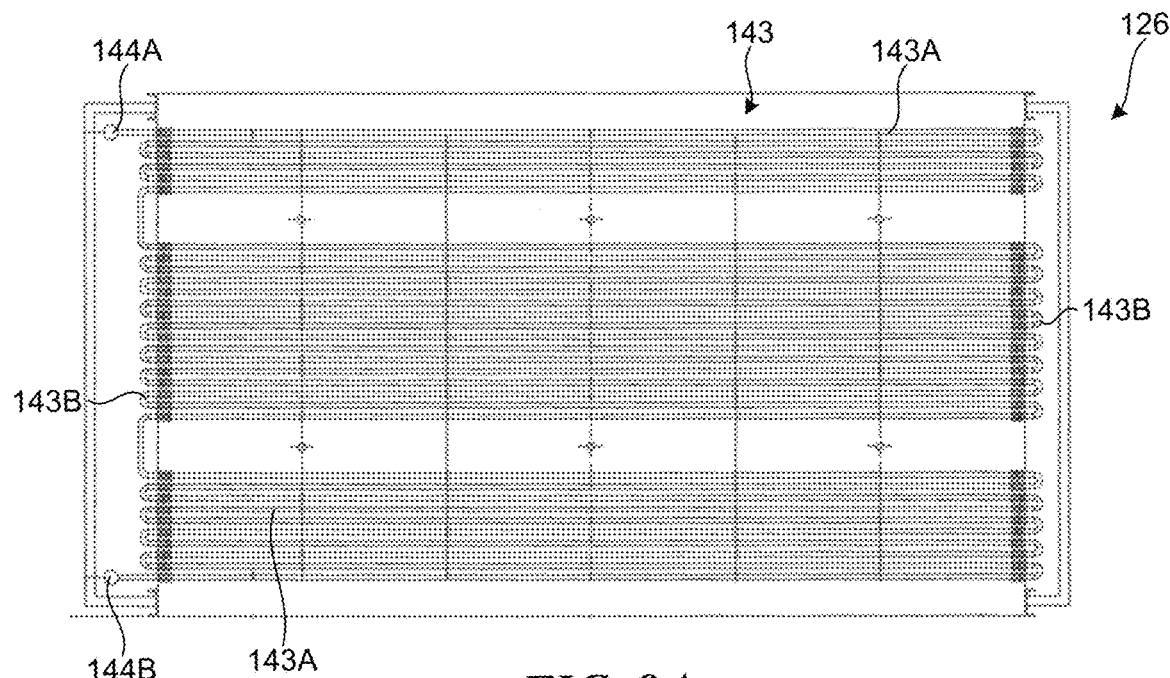
FIGS. 8A and 8B show diagrams of an economizer configured in accordance with embodiments of the present technology.
Figure 8B:
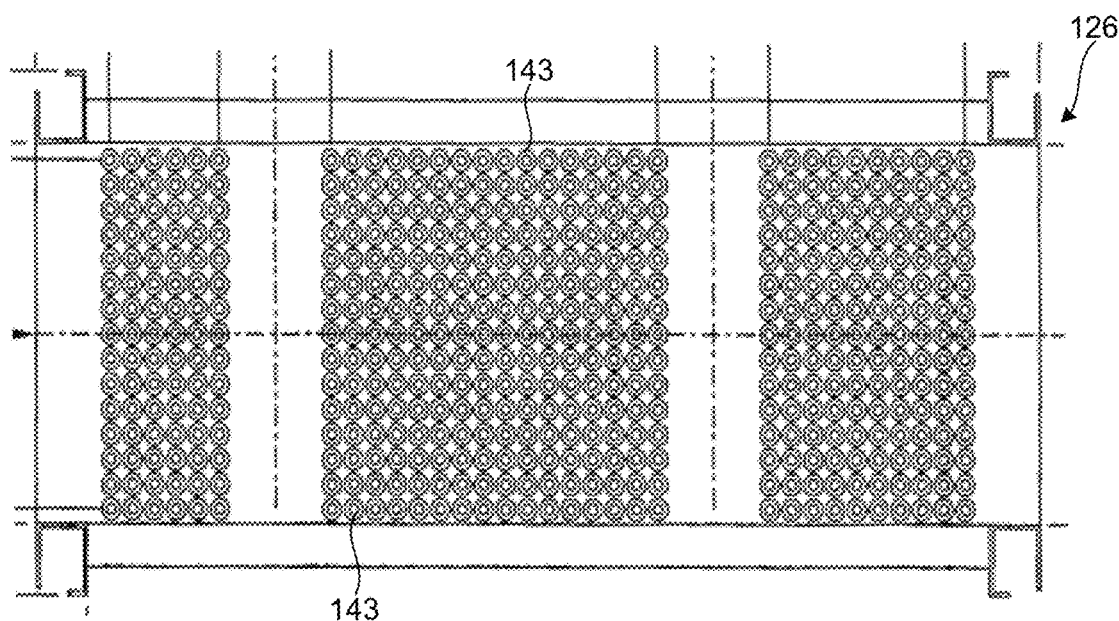

After passing by the superheaters 129, the flue gases pass through the secondary evaporators 128 and flow towards the economizer 126. FIG. 8A is a front view of the economizer 126 showing a single economizer tube 143 and FIG. 8B is a diagram showing the side of the economizer 126. The economizer 126 includes a plurality of economizer tubes 143 positioned adjacent to each other. Each of the economizer tubes 143 has a plurality of straight segments 143A and a plurality of curved segments 143B that couple adjacent straight segments 143A together. With this arrangement, each of the economizer tubes 143 can have a generally serpentine configuration.

During operation of the economizer 126, feedwater from outside of the HRSG 120 is directed into each of the economizer tubes 143 by a feedwater inlet 144A. As the feedwater flows through the economizer tubes 143 by following the serpentine path, flue gases within the HRSG 120 can flow between adjacent economizer tubes 143, causing the economizer tubes 143 to heat up. The economizer tubes 143, which are typically formed from metal, can then transfer at least some of the absorbed thermal energy to the feedwater flowing through the economizer tubes 143. However, the high pressures within the economizer tubes can ensure that the feedwater remains a liquid at these elevated temperatures. Once the heated feedwater reaches the end of the economizer tubes 143, the heated feedwater is directed out of the economizer 126 and into tube 144B, which directs the heated feedwater into the mud drums 130B. Further, once the flue gases pass by the economizer 126, the flue gases can be sufficiently cool and can be directed out of the HRSG 120.

In the embodiments shown in FIGS. 5A-8B, the tubes 135, 138, and 143 are each depicted as being generally cylindrical and not having protrusions extending away from the tubes. In other embodiments, however, some or all of these tubes can include fins that extend away from the tubes and act as heatsinks that can help the tubes absorb additional heat from the flue gas.

Figure 9:
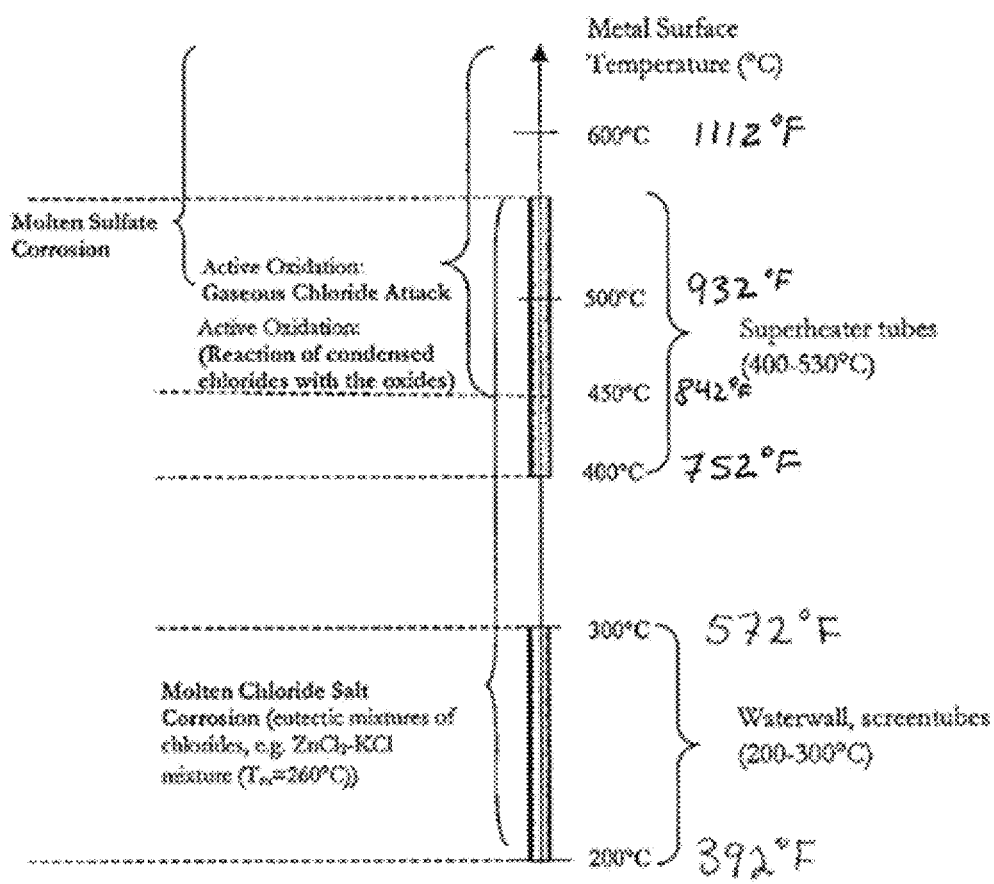
FIG. 9 is a chart that compares temperature ranges for which contaminants within the flue gas are corrosive for steel tubes.

During the coking process, contaminants found in the coal are emitted from the coal and are expelled from the coke oven as part of the flue gas. In some embodiments, these contaminants can include sulfur, chlorine, ash, and other materials/chemicals. When the flue gas leaves the coke oven, the flue gas can sometimes be hot enough to cause the contaminants to vaporize and be in a gaseous state. When the flue gas reaches the HRSG 120 and begins to cool, however, these contaminants condense into liquids and solids that are extremely corrosive. As these condensed contaminants flow around the various components of the steam generation system 125, the contaminants can be deposited onto, e.g., the exterior surfaces of the evaporator, superheater, and economizer tubes as well as the vertical support tubes and the waterwall. In conventional heat recovery steam generators, these tubes are formed entirely from steel, which is extremely prone to corrosion. FIG. 9 is a chart that compares the temperature ranges for which the contaminants are corrosive for steel tubes. For example, the superheater tubes 138 can be heated by the hot flue gases such that the portions of the steel are between 700° F. and 1100° F. At these temperatures, the steel that forms the superheater tubes 138 is subject to corrosion from molten sulfates and oxidation caused by gaseous chlorides. In addition, evaporator tubes 135, including the evaporator tubes 135 that form both the waterwall 133 and the evaporators 127 and 128, can be heated such that portions of the steel can reach temperatures between 390 and 800° F., which puts the evaporator tubes 135 at risk of corrosion caused by molten chloride salts.

Figure 10:
FIGS. 10-16 show the effects of corrosion caused by contaminants within the flue gas interacting with the steel tubes within the HRSG.
Figure 11:
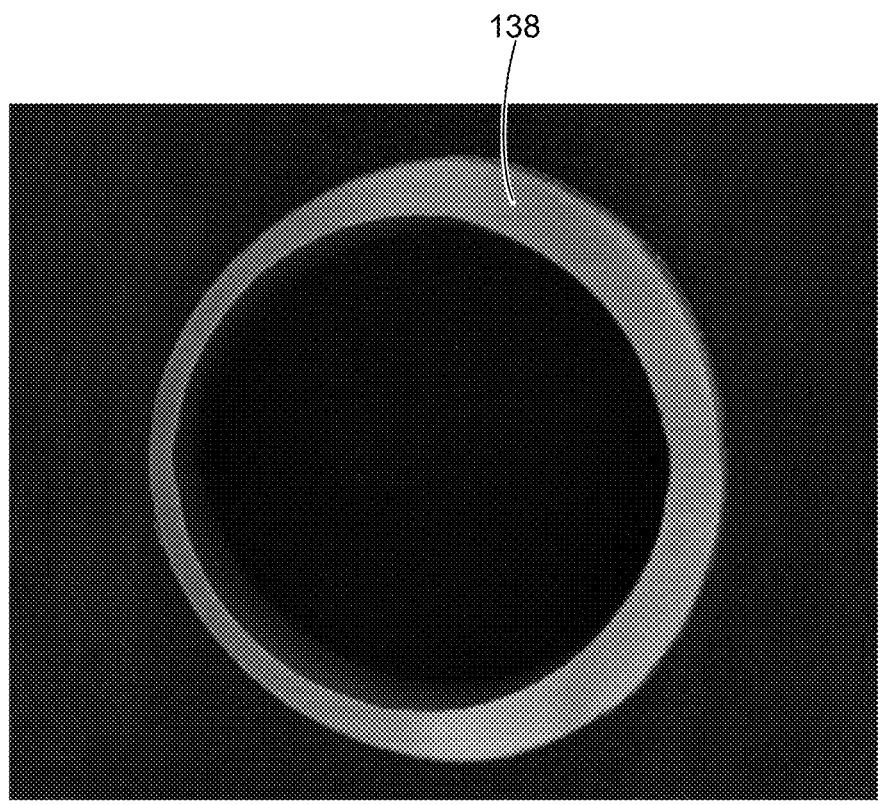
Figure 12:
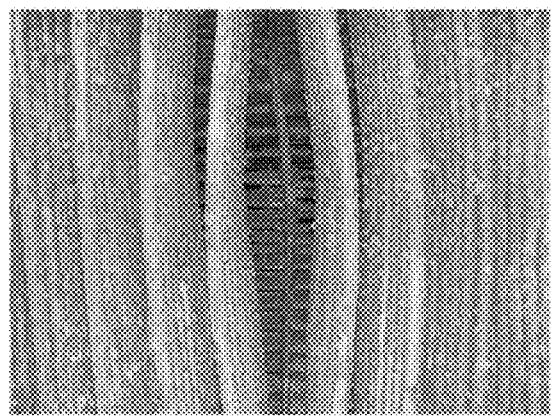
Figure 13:
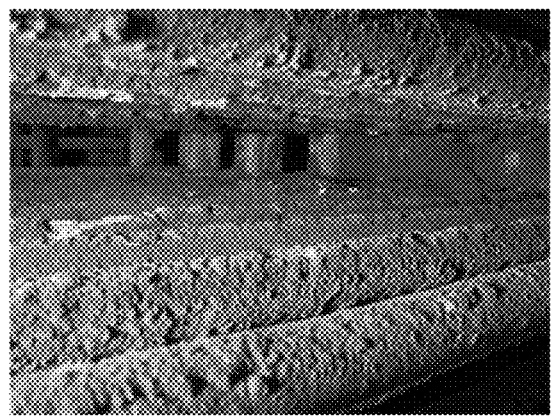
Figure 14:

FIGS. 10-16 show the effects of corrosion and degradation caused by contaminants interacting with the heated steel. FIG. 10 shows the exterior surface of one of the superheater tubes 138 after the steel has corroded. During operation of the HRSG 120, a protective layer of oxidation is stripped off of the steel by alkali compounds in the flue gas. The steel is thus left exposed to the corrosive compounds in the flue gas that attack the metal surface and can cause it to thin. FIG. 11 shows a cross-sectional view of one of the superheater tubes 138. During operation of the HRSG 120, the protective oxidation layer is stripped off by chlorine compounds in the flue gas, exposing the unprotected steel to deposited compounds such as carbon. The carbon can then migrate into the crystal structure of the steel and weaken the material. Other deposits, such as chloride salts and sulfates can then adhere to the carburized layer that forms as the carbon migrates into the steel. The various corrosive compounds in the flue gas have worn away a portion of the steel, resulting in localized thinning of the tube wall. If left unchecked, this thinning can continue until pin holes form through the tube wall, allowing the superheated steam within the superheater tube 138 to leak out of the superheater tube 138. If the tubes are heated to too high of a temperature, the steel can soften and the tubes can deform and bend. For example, FIG. 12 shows evaporator tubes that have bent due to overheating of the steel. FIG. 13 shows an oblique view of a portion of ash deposits that can form on the steel tubes and FIG. 14 shows how the contaminants can cause pitting in the steel tubes.

Figure 15:
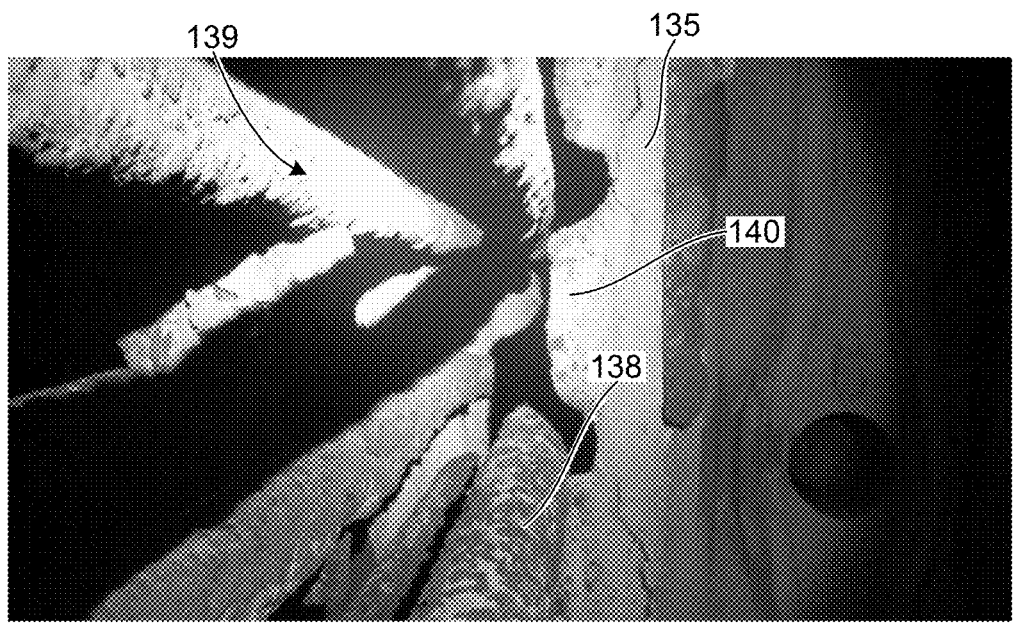
Figure 16:
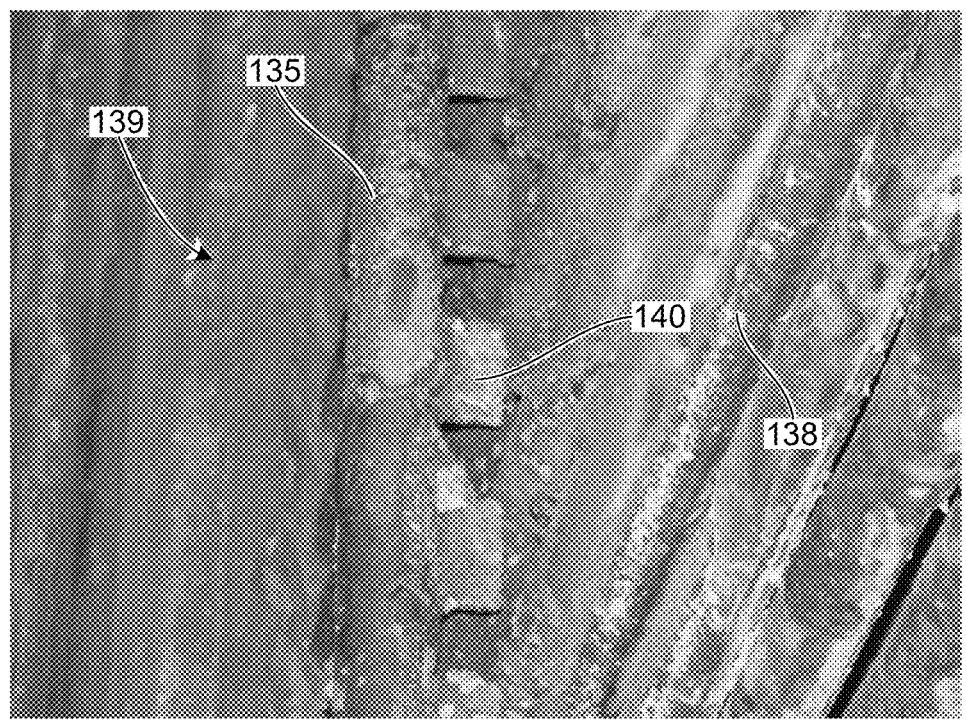

FIGS. 15 and 16 show how the corrosive compounds can corrode the fins 140 of the vertical support tubes that are used to hold the superheater tubes 138 in place. While the evaporator tubes 135 and the superheater tubes 138 have water flowing through them, which can help to cool down the steel that forms these tubes, the fins 140 are formed entirely from metal and project away from the water within the evaporator tubes 135. Accordingly, the fins 140 do not experience significant cooling from the water within the evaporator tubes 135. In fact, the fins 140 can act as heat sinks that draw more heat from the flue gas, which can lead to localized heating of the evaporator tubes 135 near where the fins 140 are attached to the evaporator tubes 135. As a result, the corrosive contaminants in the flue gas corrode away the steel that forms the fins 140 significantly faster than the evaporator tubes 135 or the superheater tubes 138. Accordingly, corrosive flue gas can corrode the vertical support tubes 139, leading to the superheater tubes 138 being unsupported, which can damage the superheater 129. Further, the localized heating of the evaporator tubes 135 can accelerate corrosion around the evaporator tubes near the fins that can cause the tubes 135 to fail more quickly, potentially causing damage to other tubes in the HRSG 120.

Figure 17B:
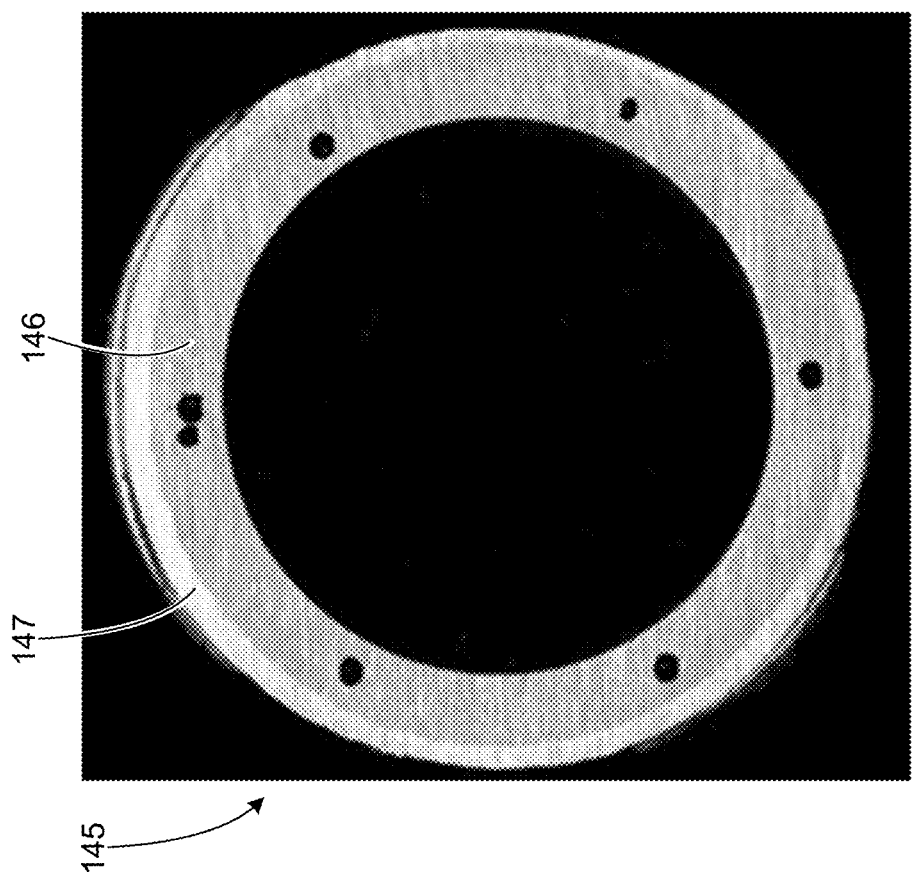
FIG. 17B show a cross-sectional view of one of the tubes shown in FIG. 17A.
Figure 17A:
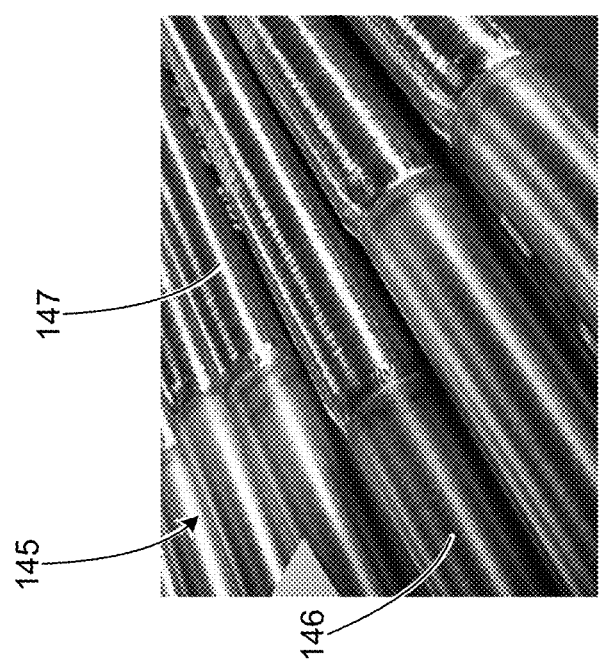
FIG. 17A shows a plurality of tubes having a corrosion-resistant alloy cladded to a steel portion of the tube and configured in accordance with embodiments of the present technology.

To extend the lifetime of the tubes within the HRSG 120, in some embodiments, the thickness of the walls of the tubes can be increased. The thickness of fins 140 can also be increased. In this way, the amount of time that these tubes/fins can operate without corrosion affecting the performance of the HRSG 120 can be prolonged. However, increasing the thickness of the tubes/fins may not be enough to sufficiently prolong the lifetime of these tubes. To further reduce and/or eliminate the corrosive effects of the flue gas on the tubes/fins, at least some of the steel components within the HRSG 120 (e.g., tubes or fins) can be clad with a corrosion resistant alloy or other corrosion resistant material. FIG. 17A shows an isometric view of a plurality of tubes 145 having a steel portion 146 and a corrosion resistant portion 147 cladded to the steel portion and FIG. 17B shows a cross-sectional view of one of the tubes 145. The corrosion resistant portion 147 is formed from a corrosion-resistant alloy or material that resists corrosion at elevated temperatures. In representative embodiments, the corrosion-resistant alloy is a Nickel-based alloy. For example, in some embodiments, the corrosion resistant portion 147 comprises a Nickel-Chromium alloy such as Inconel. In other embodiments, the corrosion resistant portion 147 comprises a Nickel-Molybdenum such as Hastelloy, a Nickel-Molybdenum-Chromium-Copper alloy such as Illium or a Nickel-Copper alloy such as Monel. Other alloys, such as Ferritic alloy steels (e.g., T22 and T91 alloy steel) can also be used. In some embodiments the corrosion resistant portion 147 comprises two or more corrosion resistant materials, such as a cladding including a first layer of a first corrosion resistant material and a second layer disposed on the first layer, the second layer being made from a second corrosion resistant material different from the first corrosion resistant material. In one non-limiting example, T91 alloy steel can be overlaid with Inconel to form the corrosion resistant portion 147. In embodiments where the corrosion resistant portion 147 is an alloy, the corrosion resistant portion 147 can include any Nickel-based alloy or superalloy that has high resistance to corrosion at high temperatures. In this way, the corrosion resistant portions 147 can prevent (or at least reduce) corrosion caused by the contaminants in the hot flue gas interacting with the tubes. Further, when it is discovered that tubes in existing heat recovery steam generators that are formed only from steel and do not have corrosion resistant portions have corroded, these corroded tubes can be easily switched out for tubes 145 having the corrosion resistant portions 147. In this way, older heat recovery steam generators can be retrofitted to increase their performance and lifespan without a completely new heat recovery steam generator having to be constructed.

In other embodiments, the corrosion resistant material used for at least a portion of corrosion resistant portion 147 is silicon carbide. Silicon carbide is both chemically resistant and provides good heat transfer, thereby making it a suitable material for the corrosion resistant portion 147. In some embodiments, the corrosion resistant portion 147 is a layer of silicon carbide with no other layers or materials. In other embodiments, the silicon carbide is used in conjunction with other materials to form the corrosion resistant portion 147, such as with previously discussed alloys. In one non-limiting example, T91 alloy steel can be overlaid with silicon carbide to form the corrosion resistant portion 147.

To clad the steel portions 146 of the tubes 145 with the corrosion resistant portion 147, the corrosion resistant portion 147 can be welded to the steel portions 146. For example, in some embodiments, an automatic welding system, such as an orbital welder, can weld the corrosion-resistant material to the steel before the tubes 145 are installed within the HRSG 120. In this way, the corrosion resistant portion 147 can have a generally uniform thickness and properties. However, it may not be desirable for each of the tubes 145 to be completely cladded with the corrosion resistant material along the entire length of the tubes 145 as it is typically not possible (or it is at least very difficult) to weld the corrosion resistant material-clad steel to other metals. Accordingly, end portions of each of the tubes 145 are typically uncladded so that they can be more easily welded to each other or to other components of the HRSG 120. For example, as previously discussed in connection with FIG. 7B, the superheater tubes 138 include straight segments 138A and curved segments 138B. When the superheaters 129 are assembled (or repaired) a straight segment 138A and a curved segment 138B can be coupled together by welding the uncladded end portion of the straight segments 138A to the uncladded curved segment 138B. Similarly, two straight segments 138A can be coupled together by welding uncladded end portions of the two segments together. Further, when the superheater tubes 138 are attached to the tubes 141A and 141B, which act as headers for the individual superheater tubes 138, uncladded steel portions of the superheater tubes 138 are welded to the tubes 141A and 141B. In some embodiments, the tubes 141A and 141B can include stubs that extend toward the superheater tubes 138 and the uncladded steel portions of the superheater tubes 138 can be welded to these stubs. In other embodiments, the uncladded steel portions can extend into the tubes 141A and 141B and can then be welded to the tubes 141A and 141B. The evaporator tubes 135 can also have uncladded end portions. In this way, the evaporator tubes 135 can be coupled to the drums 130A and 130B by welding uncladded end portions of the evaporator tubes 135 to the drums 130A and 130B.

In the case of, for example, evaporator tubes, the evaporator tubes can be inserted into the steam and mud drums and then rolled and welded in place, and therefore, the ends are not typically overlaid originally. Consequently, for the non-overlay ends that have been inserted into the drum, a field overlay can be used (as discussed above) or the overlay sections can be coated in refractory. For example, if an evaporator tube is extending into the drum, a refractory coat can be applied to the end into the drum as a protective layer. When the HRSG is opened, the refractory can be checked and replaced if needed. A similar process can be performed for uncoated portions.

In some embodiments, after each of the uncladded end portions has been welded in place, the uncladded end portions can then be cladded with the corrosion resistant material by manually welding the corrosion resistant material to the exposed steel portions. In other embodiments, after the uncladded end portion for the individual tubes has been welded in place, the uncladded end portions can then be encased in refractory instead of being clad with the alloy portion 147.

In some embodiments, all of the tubes within the HRSG 120 can include an corrosion resistant portion 147 cladded to the steel portion. For example, all of the evaporator tubes 135 that form the primary and secondary evaporators 127 and 128, all of the evaporator tubes 135 that form the waterwall 133, all of the superheater tubes 138 for the superheaters 129, all of vertical support tubes 139 (including fins 140 and the evaporator tubes 135 that the fins 140 are coupled to), and all of the economizer tubes 143 for the economizer 126 can include corrosion resistant portions 147 cladded to steel portions 146. Other portions of the HRSG 120, such as the exterior walls 136, can also include corrosion resistant portions 147. In other embodiments, however, only some of the tubes can include the corrosion resistant portions 147. For example, in some embodiments, the economizer tubes 143 may not include a corrosion resistant portion 147. As the hot flue gases flow through the HRSG 120, the various components of the steam generation system 125 cause the flue gas to cool down such that, by the time the flue gases reach the economizer 126, the flue gases are cool enough that the contaminants in the flue gases are not as corrosive to the steel. In these embodiments, it may not be necessary to clad the economizer tubes 143 with the corrosion resistant portion 147 as the risk of the steel economizer tubes 143 corroding is sufficiently reduced. In still other embodiments, only a portion of individual tubes can include a corrosion resistant portion 147. For example, to ensure that the superheater tubes 138 are properly welded to the tubes 141A and 141B, end portions of individual of the superheater tubes 138 are typically not cladded with the corrosion resistant portion 147. Instead, the superheater tubes 138 can extend through the waterwall 133 so that the uncladded end portions are behind the waterwall 133 and are therefore not in the flow path of the hot and corrosive flue gases. With this arrangement, only portions of the superheater tubes 138 having the corrosion resistant portion 147 can be in the flow path of the flue gases while the uncladded portions are protected by the waterwall 133.

In some embodiments, welds used to join together various pipes used in the HRSG can be cladded with corrosion resistant material to ensure the welds are not corroded and weakened. For example and with reference back to FIG. 7C, welds 140a can be used to weld fins 140 to the vertical support tubes 139. In order to protect this type of weld, corrosion resistant material, such as any of the corrosion resistant material discussed previously, can be cladded over the weld 140a. With further reference to FIG. 7C, wear plates can be provided between the fins 140 and the superheater tubes 138 to further support the superheater tubes 138 and protect the fins against corrosion. In some embodiments, such wear plates are made from corrosion resistant material as discussed previously, including T22 alloy steel.

Figure 18:
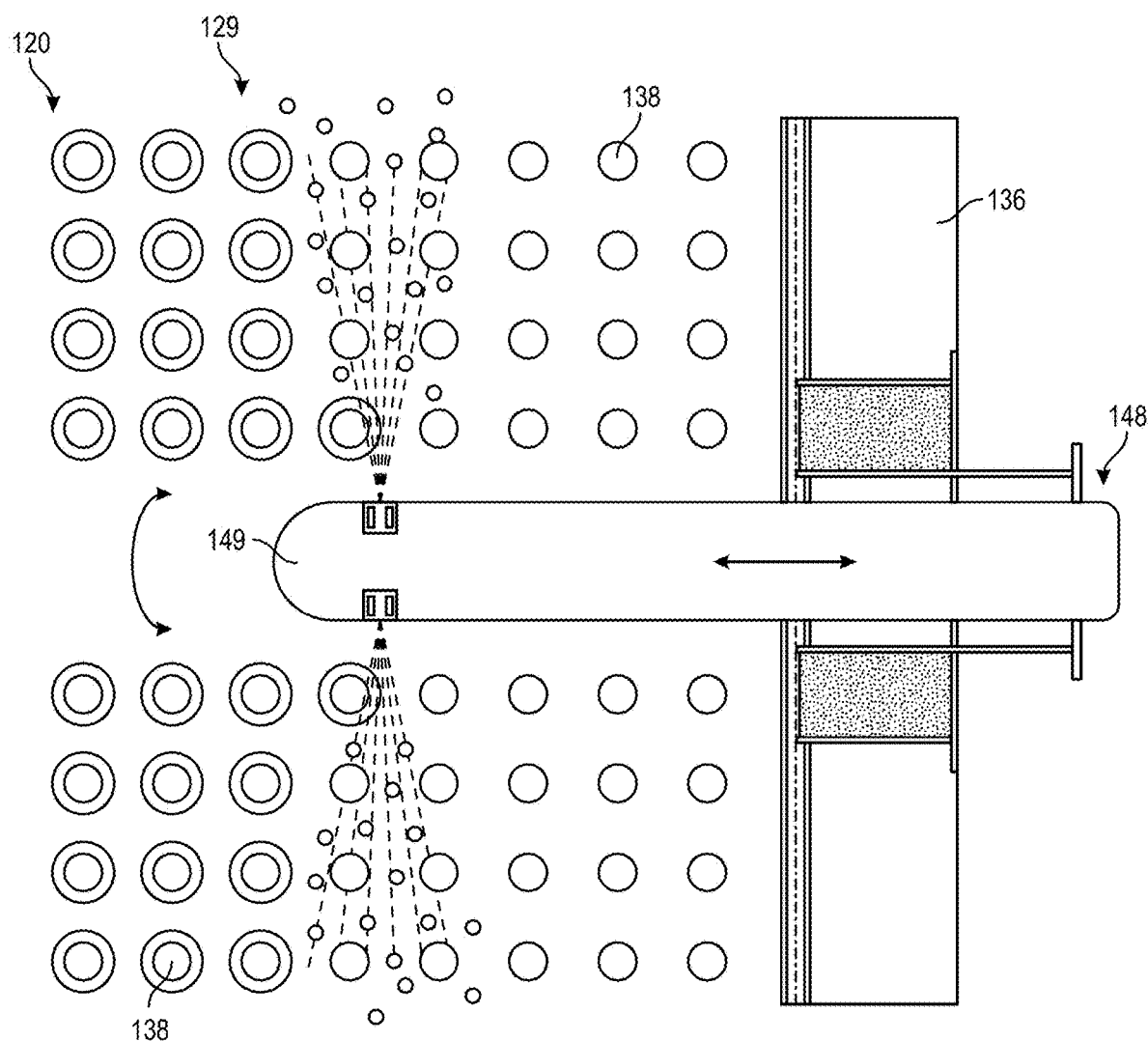
FIG. 18 shows a diagram of a sootblower used to remove precipitated particles from the tubes, in accordance with embodiments of the present technology.

During operation of the HRSG 120, ash and other particulate matter can be deposited on the various tubes within the HRSG 120. Embodiments of the HRSG 120 in which some or all of the tubes have fins that extend away from the tubes are particularly prone to deposits forming on the various tubes as the fins can help to trap the deposits. In addition to potentially corroding and damaging these tubes, the particulate matter can sometimes reduce heat transfer between the hot flue gas and the tubes. Accordingly, to ensure that these deposits do not severely impact the performance of the HRSG 120, the HRSG 120 can include one or more sootblowers that are configured to blow deposits off the tubes. For example, FIG. 18 shows a diagram of a sootblower 148 having an extending portion 149 that extends through the exterior wall 136 of the HRSG 120. The sootblower 148 is positioned such that the extending portion 149 moves into and out of one of the superheaters 129 and blows deposits off of the superheater tubes 138. However, in some embodiments, the sootblower 148 blows steam and/or liquid water onto the superheater tubes 138, which can cause the superheater tubes to erode. To prevent the sootblower from damaging the superheater tubes 138, superheater tubes 138 near the sootblower 148 can include the corrosion resistant portion 147 cladded to the superheater tubes 138. In this way, the corrosion resistant portion 147 can limit and/or prevent the water emitted by the extending portion 149 from damaging the superheater pipes. In some embodiments, only the superheater tubes 138 near the extending portion 149 of the sootblower 148 have the corrosion resistant portion 147 while the superheater tubes 138 positioned further away do not. For example, in some embodiments, only the first row of superheater tubes closest to the sootblower 148 include corrosion resistant portions. In other embodiments, superheater tubes 148 located within 2 rows of the sootblower 148 include the corrosion resistant portion, while in other embodiments, only the superheater tubes 138 located within 4 rows of the sootblower 148 include the alloy portion 147. Regardless of the number of rows of superheater tubes 138 cladded with corrosion resistant portion 147, the corrosion resistant material can be cladded along some or all of the length of the superheater tube within the given row. For example, in some embodiments, the superheater tubes that are cladded with corrosion resistant material are cladded only on the length of the superheater tube 138 closest to the sootblower 148. In other embodiments, the entire length of the superheater tubes in the rows being cladded are cladded with corrosion resistant material.

While sootblowers 148 can be used to clean tubes within the HRSG as described previously, other cleaning techniques can also be used, including cleaning techniques that do not run the risk of corroding the tubes and therefore do not require additional cladding to protect tubes near the sootblower. For example, explosive cleaning can be used to keep tubes within the HRSG, including superheater tubes, clean.

In the previously discussed embodiments, the tubes are described as being formed from a steel portion that is clad with a corrosion-resistant material. In other embodiments, however, the tubes can have a different formulation. For example, in some embodiments, the tubes may not include a steel portion and instead may be formed entirely from the corrosion-resistant material. Further, in tubes that do include the steel portion, the metallurgy and composition of the steel may be chosen based on the specific configuration and operating conditions of the HRSG and the coke plant as well as the location of the tube within the HRSG. Different types of steel, such as carbon steel, T22 steel, and T91 steel all have different compositions that affect their resistance to corrosion as well as the temperature ranges for which they are the most effective. For example, T22 steel offers better corrosion resistance than carbon steel but not as much corrosion resistance as T91 steel. However, a tube formed form T22 steel that has been cladded with a corrosion resistant alloy (e.g., Inconel) can have better corrosion resistance than a tube formed only form T91 steel. In some embodiments, individual tubes can also include more than one type of steel. For example, the evaporator tubes that form part of the vertical support tubes can be formed from a T22 steel tube clad with Inconel while the fins that are welded to the evaporator tube are formed from a 9Cr steel that tends to resist high temperature corrosion than T22 steel tube does.

Figure 19A:
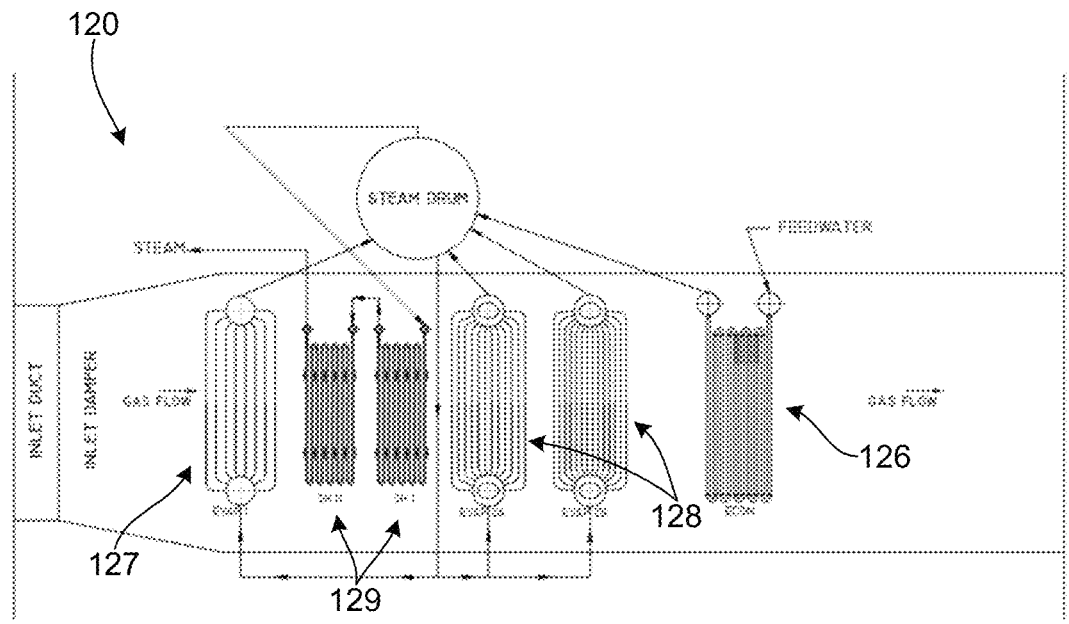
FIGS. 19A-E show diagrams of HRSGs having different layouts and arrangements, in accordance with embodiments of the present technology.
Figure 19B:
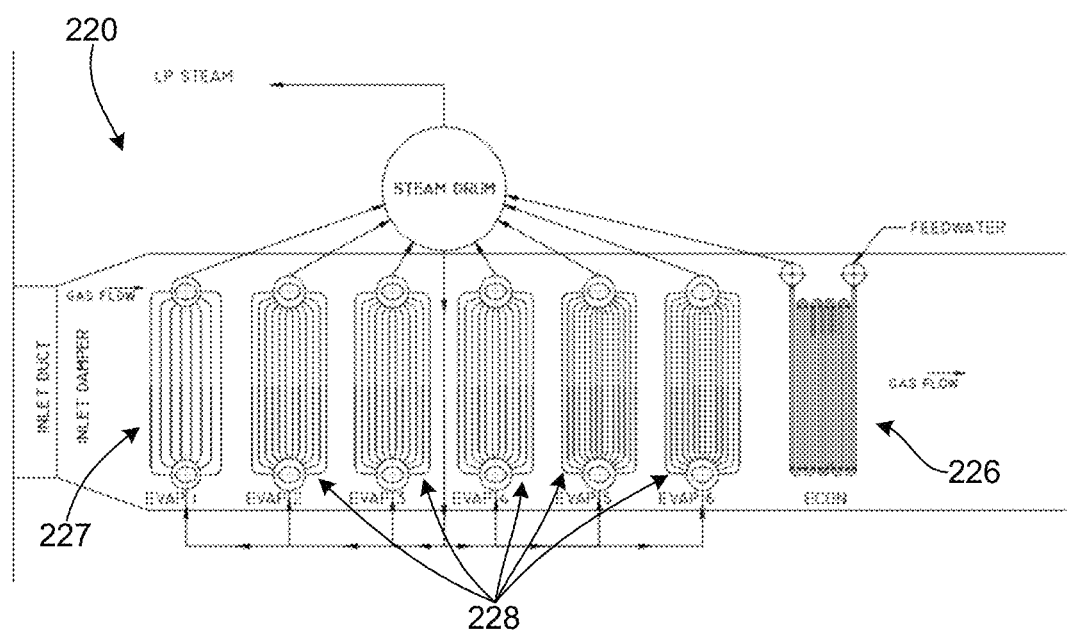
Figure 19C:
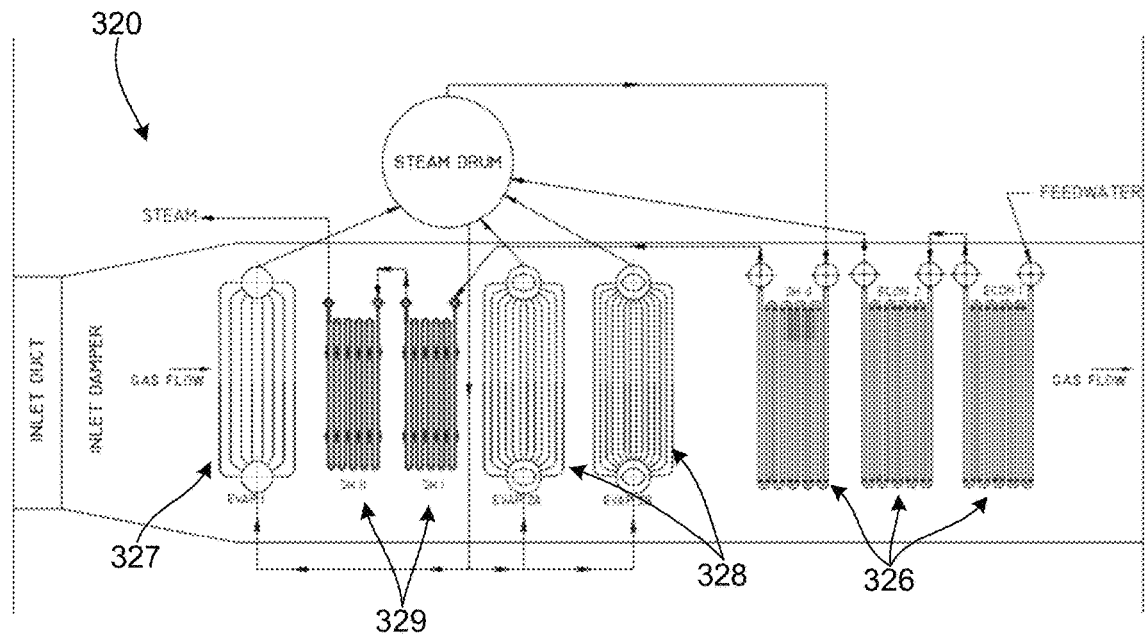
Figure 19D:
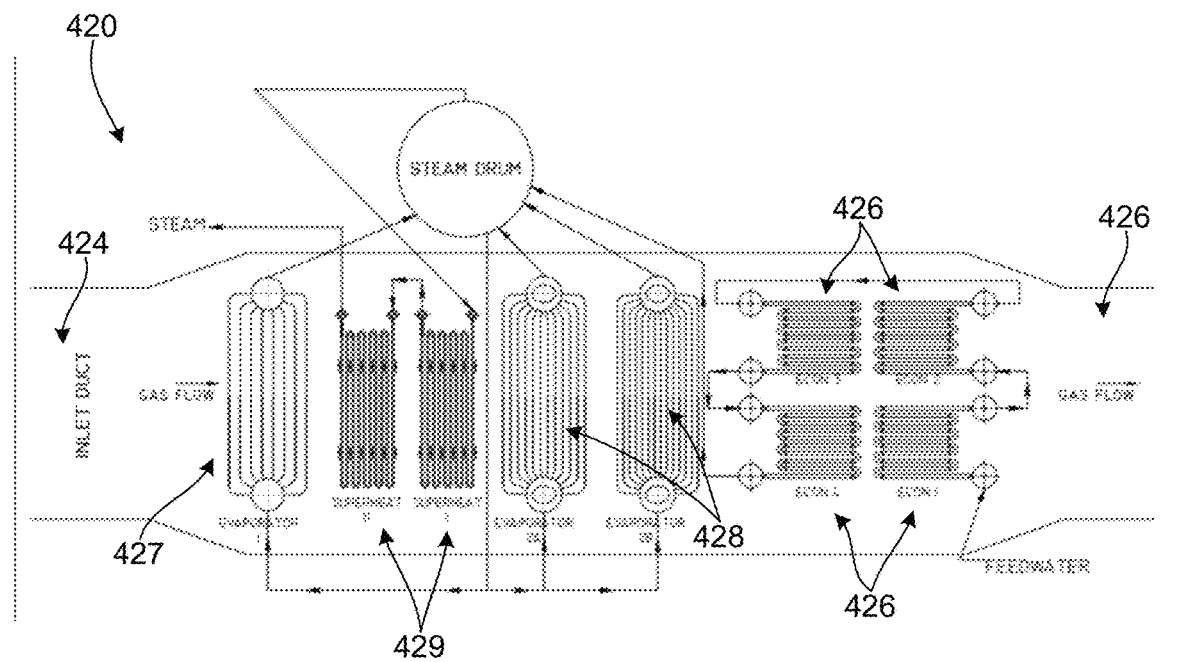

FIG. 19A shows a diagram of the HRSG 120 depicted in FIGS. 3 and 4. In the illustrated embodiment, HRSG 120 includes a single economizer 126, a primary evaporator 127, two secondary evaporators 128, and two superheaters 129. In other embodiments, however, the steam generation system can have a different configuration. For example, FIG. 19B shows a diagram of a HRSG 220 that includes a single economizer 226, a primary evaporator 227, and five secondary evaporators 228 and does not include a superheater. With this arrangement, the HRSG 220 can be configured to produce low pressure steam and can provide the low-pressure steam to a chemical plant that requires low pressure steam, instead of a steam turbine. FIG. 19C shows a diagram of a HRSG 320 that includes three economizers 326 fluidly coupled together in series, a primary evaporator 327, two secondary evaporators 328, and two superheaters 329. FIG. 19D shows a diagram of a HRSG 420 that includes four economizers 426 coupled together in series, a primary evaporator 427, secondary evaporators 428, and two superheaters 429.

In the embodiment shown in FIG. 19D, the two superheaters 429 are fluidly coupled together in series such that the steam traveling through the two superheaters generally flows in the opposite direction from the flowing gas moving through the HRSG 420. In other words, the inlets for both superheaters 429 are positioned downstream from the outlets. With this arrangement, the steam flowing through the superheater tubes positioned closer to the inlet duct 424 tends to be hotter than the steam flowing through the superheater tubes closer to the outlet duct 426. By arranging the HRSG in this way, the steam can be superheated to an extremely high temperature. However, this arrangement also causes the superheater tubes nearer to the inlet duct 424 to be heated to a very high temperature as the steam within these pipes is too hot to provide significant cooling to the pipes, which can increase the corrosion on these pipes. Accordingly, in some embodiments, the superheaters can be arranged to reduce the temperature of the superheater tubes.

Figure 19E:
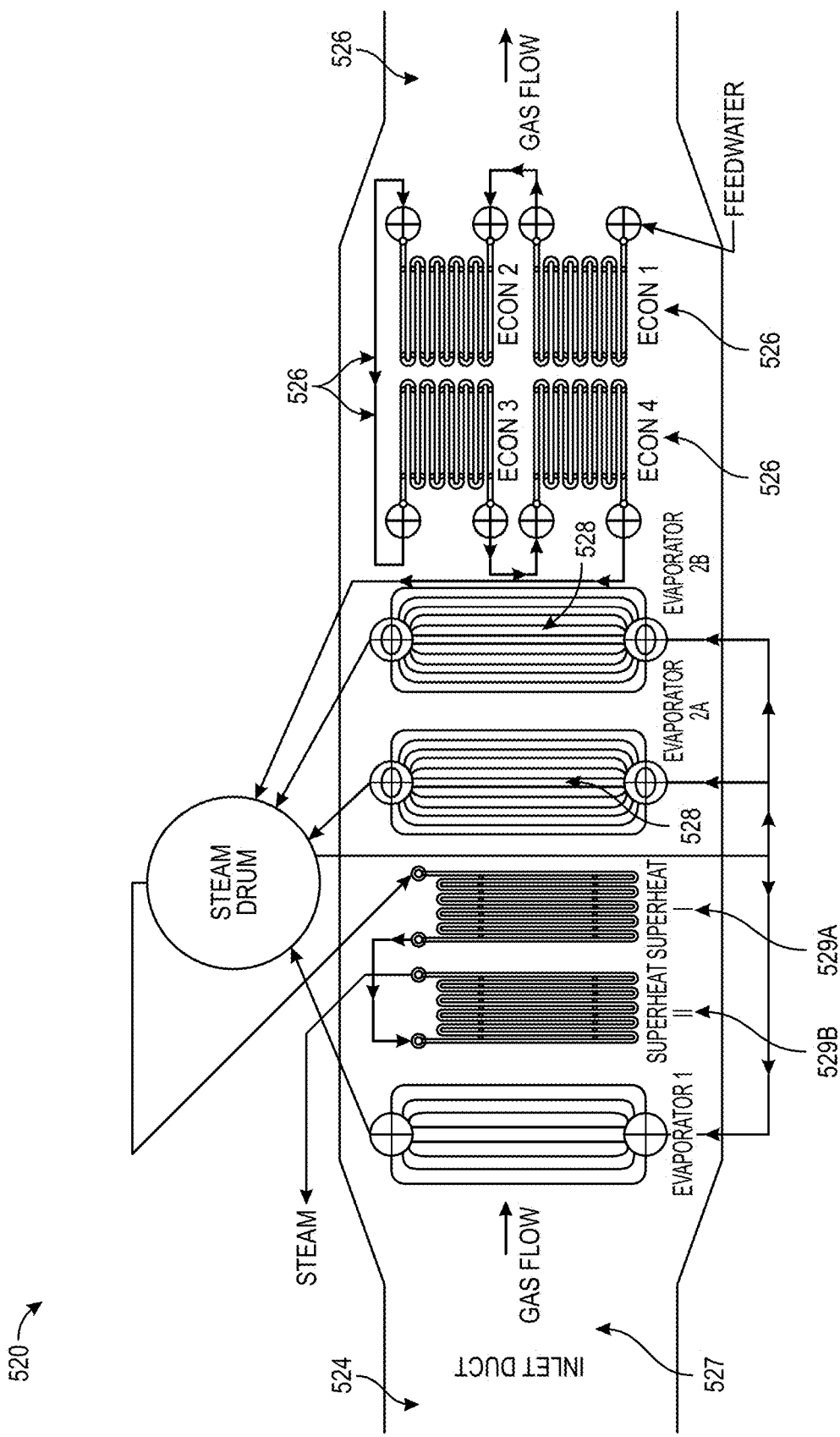

FIG. 19E shows a diagram of an HRSG 520. As in the HRSG 420 shown in FIG. 19D, the HRSG 520 includes four economizers 526 coupled together in series, a primary evaporator 527, secondary evaporators 528, and two superheaters 529A and 529B. In contrast to the superheaters 429, the superheaters 529A and 529B are fluidly coupled together in series such that the steam flowing through the first superheater 529A flows in the opposite direction from the flowing gas moving through the HRSG 520 while the steam flowing through the second superheater 529B flows in the same direction as the flowing gas. With this arrangement, the tubes of the second superheater 529B that are positioned closer to the inlet duct 524 can be heated to a lower temperature as the steam flowing through these tubes is typically cooler and can provide some cooling. While arranging the superheaters 529A and 529B in this way can reduce the heating efficiency of the HRSG 520, and therefore the maximum temperature that the steam can be superheated, this arrangement can also result in the superheater tubes being heated to a lower temperature, which can reduce the rate at which these tubes corrode and can increase the lifespan of the HRSG 520. In some embodiments, the superheaters 529A and 529B can be arranged such that the steam flowing through both of the superheaters 529A and 529B flows in the same direction as the gas flowing through the HRSG 520.

Other HRSG configurations not shown in FIGS. 19A-E can also be used. In one example, the HRSG configuration is similar to the configuration shown in FIG. 19E, but includes a superheater at the front end of the HRSG. Furthermore, while FIGS. 19A-19E and other descriptions of HRSGs provided herein reference and/or illustrate a horizontally oriented HRSG, it should be appreciated that the technology described herein is equally applicable to vertically oriented HRSGs. Vertically oriented HRSGs can have some benefits over horizontally oriented HRSGs. For example, vertically oriented HRSGs can obviate the need for support fins 140 as shown in FIG. 7C.

Figure 20:
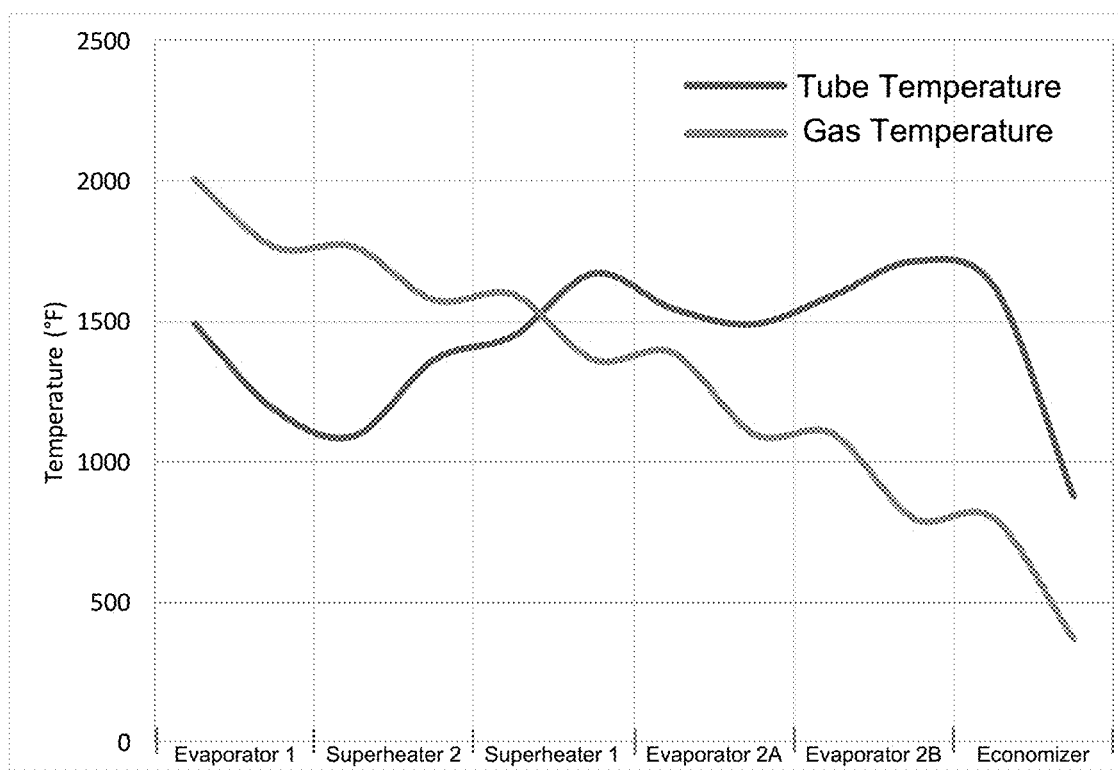
FIG. 20 shows a graph charting tube temperature and flue gas temperature at various stages of an HRSG configured in accordance with embodiments described herein.

FIG. 20 is a graph charting tube temperature and flue gas temperature throughout an HRSG as described herein, and more specifically, and HRSG as shown in, for example, FIG. 19A (having a primary evaporator 127, two superheaters 129, two secondary evaporators 128 and an economizer). As shown in FIG. 20, the temperature of the flue gas decreases steadily as it moves from the inlet of the HRSG 120 to the outlet of the HRSG, based on heat from the flue gas being transferred to the various tubes of the components of the HRSG. Tube temperature fluctuates non-uniformly across the length of the HRSG based on the specific path of the fluid flowing through the tubes that is not a direct line path from the inlet to the outlet of the HRSG (e.g., fluid first goes through the economizer positioned near the outlet of the HRSG, and is then directed to the primary evaporator positioned near the inlet of the HRSG).

From the foregoing, it will be appreciated that specific embodiments of the invention have been described herein for purposes of illustration, but that various modifications may be made without deviating from the scope of the invention. Accordingly, the invention is not limited except as by the appended claims.

We claim:
1. A heat recovery steam generator (HRSG) configured to receive flue gases, the HRSG comprising:

an inlet duct positioned at a first end of the HRSG and configured to receive the flue gases;

an outlet duct positioned at a second end of the HRSG, wherein the flue gases are configured to flow through the HRSG by flowing from the inlet duct to the outlet duct; and a steam generation system fluidly isolated from the flue gases flowing through the HRSG, wherein the steam generation system comprises:

at least one economizer configured to receive liquid water at a first temperature, wherein the at least one economizer includes a plurality of economizer tubes through which the liquid water flows, wherein the flue gases flowing through the HRSG heat the liquid water within the plurality of economizer tubes from the first temperature to a second temperature greater than the first temperature;

at least one evaporator configured to receive the liquid water at the second temperature from the at least one economizer, wherein the at least one evaporator includes a plurality of evaporator tubes through which the liquid water flows, wherein the flue gases flowing through the HRSG heat the liquid water within the plurality of evaporator tubes until the liquid water evaporates into steam, and wherein at least a portion of individual ones of the plurality of evaporator tubes comprise a base material including steel, and a cladding material that is resistant to corrosion at high temperatures and disposed over the base material, wherein the cladding material comprises a metal alloy ad forms an outermost layer of the individual ones of the plurality of evaporator tubes.

2. The HRSG of claim 1, the steam generation system further comprising:

at least one superheater wherein the at least one superheater includes a plurality of superheater tubes through which the steam flows, wherein the flue gases flowing through the HRSG superheat the steam within the plurality of superheater tubes, and wherein at least a portion of individual of the plurality of superheater tubes are cladded with the cladding material resistant to corrosion at high temperatures.

3. The HRSG of claim 2, wherein the pluralities of economizer tubes, evaporator tube, and superheater tubes comprise steel.

4. The HRSG of claim 1 wherein the metal alloy comprises a Ni-Cr alloy.

5. The HRSG of claim 3, wherein the metal alloy comprises Ferritic alloy steel.

6. The HRSG of claim 2, wherein the cladding material resistant to corrosion at high temperatures comprises a first layer of a Ferritic alloy steel and a second layer of Inconel disposed on the first layer.

7. The HRSG of claim 2, wherein the plurality of superheater tubes is supported by support tubes.

8. The HRSG of claim 7, wherein the support tubes include the evaporator tubes.

9. The HRSG of claim 2 wherein the plurality of superheater tubes are oriented horizontally, wherein the at least one superheater includes one or more vertical support tubes configured to support the plurality of superheater tubes, and wherein at least a portion of the one or more vertical support tubes is cladded with the cladding material resistant to corrosion at high temperatures.

10. The HRSG of claim 9, wherein the one or more vertical support tubes include generally horizontally projecting fins on which the superheater tubes are disposed.

11. The HRSG of claim 10, wherein at least a portion of the fins are cladded with the cladding material resistant to corrosion at elevated temperatures.

12. The HRSG of claim 9 wherein the one or more vertical support tubes comprises one of the plurality of evaporator tubes.

13. The HRSG of claim 2, further comprising:

a plurality of sootblowers configured to remove compounds deposited on one or more the pluralities of economizer tubes, evaporator tubes, and superheater tubes, wherein at least at least one of the individual evaporator tubes and at least one of the individual superheater tubes that are cladded with the cladding material resistant to corrosion at high temperatures are adjacent to individual of the plurality of sootblowers.

14. The HRSG of claim 2, further comprising:

an exterior wall that defines an exterior surface of the HRSG; and a waterwall within the HRSG and positioned adjacent to the exterior wall, wherein— the waterwall includes at least one of the plurality of evaporator tubes the plurality of economizer tubes and the plurality of superheater tubes, and the waterwall is configured to reduce the amount of heat given off by the flue gases that can reach the exterior wall.

15. The HRSG of claim 14 wherein at least one of the plurality of superheater tubes, economizer tubes and evaporator tubes includes a curved segment and two straight segments, wherein end portions of the two straight segments are welded to the curved segment such that the curved segment fluidly couples the two straight segments together.

16. The HRSG of claim 15 wherein the end portions of the two straight segments are free of the material resistant to corrosion at high temperatures.

17. The HRSG of claim 16 wherein the end portions of the two straight segments are coated with refractory after the end portions and the curved segment have been welded together.

18. The HRSG of claim 1 wherein each of the plurality of economizer tubes is free of the material resistant to corrosion at high temperatures.

19. The HRSG of claim 1 wherein the flue gases are configured to flow in a first direction through the HRSG, and wherein the evaporator tubes are oriented in a second direction normal to the first direction, the HRSG further comprising a superheater including a plurality of superheater tubes through which the steam from the evaporator tubes flows, wherein the superheater tubes are oriented in a third direction normal to the first direction and the second direction.

20. The HRSG of claim 1 wherein the steam generation system further comprises one or more steam drums and one or more mud drums, wherein the evaporator tubes extend between and are fluidly coupled to one or more steam drums and the one or more mud drums.

21. A heat recovery steam generator (HRSG) configured to receive flue gases, the HRSG comprising:

a steam generation system comprising:

an economizer configured to receive a fluid at a first temperature and including economizer tubes through which the fluid flows, wherein the flue gases flowing through the HRSG heat the fluid within the economizer tubes from the first temperature to a second temperature greater than the first temperature;

an evaporator configured to receive the fluid at the second temperature from the economizer, wherein the evaporator includes a plurality of evaporator tubes through which the fluid flows, wherein the flue gases flowing through the HRSG heat the fluid within the evaporator tubes until the fluid evaporates, wherein at least a portion of the evaporator tubes comprise a base material including steel, and a cladding material that is resistant to corrosion at high temperatures and disposed over the base material, wherein the cladding material comprises a metal alloy and forms an outermost layer of the portion of the evaporator tubes.

* * * * *

UNITED STATES PATENT AND TRADEMARK OFFICE
CERTIFICATE OF CORRECTION

| | |
|---|---|
| PATENT NO. | : 11,486,572 B2 |
| APPLICATION NO. | : 16/729068 |
| DATED | : November 1, 2022 |
| INVENTOR(S) | : John Francis Quanci et al. |

Page 1 of 1

It is certified that error appears in the above-identified patent and that said Letters Patent is hereby corrected as shown below:

In the Specification

In Column 4, Line 67, delete "123" and insert --124-- therefor.

In the Claims

In Column 15, Line 33 (Approx.), Claim 1, delete "ad" and insert --and-- therefor.

In Column 16, Line 14 (Approx.), Claim 13, delete "at least at least" and insert --at least-- therefor.

Signed and Sealed this
Twenty-ninth Day of April, 2025

Coke Morgan Stewart
*Acting Director of the United States Patent and Trademark Office*